US011961370B2

(12) United States Patent
Honeycutt et al.

(10) Patent No.: US 11,961,370 B2
(45) **Date of Patent: *Apr. 16, 2024**

(54) METAMORPHIC PERSISTENT SYMBOLS USING RANDOM PROBABILITY DISTRIBUTION

(71) Applicant: Aristocrat Technologies, Inc., Las Vegas, NV (US)

(72) Inventors: Robert Honeycutt, Henderson, NV (US); Ryan Hawkins, Henderson, NV (US); Yanis Tsombanidis, Las Vegas, NV (US); Emily Ross, Las Vegas, NV (US)

(73) Assignee: Aristocrat Technologies, Inc., Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 18/314,602

(22) Filed: May 9, 2023

(65) Prior Publication Data

US 2023/0274617 A1 Aug. 31, 2023

Related U.S. Application Data

(63) Continuation of application No. 17/446,927, filed on Sep. 3, 2021, now Pat. No. 11,688,247, which is a (Continued)

(51) Int. Cl.
*G07F 17/32* (2006.01)

(52) U.S. Cl.
CPC ...... *G07F 17/3269* (2013.01); *G07F 17/3213* (2013.01); *G07F 17/3244* (2013.01)

(58) Field of Classification Search
CPC ............ G07F 17/3211; G07F 17/3244; G07F 17/3269
See application file for complete search history.

(56) References Cited

U.S. PATENT DOCUMENTS 6,922,815 B2 7/2005 Rosen
7,437,005 B2 10/2008 Drucker (Continued)

OTHER PUBLICATIONS

Notice of Allowance dated Nov. 3, 2022 for U.S. Appl. No. 29/789,308 (pp. 1-6).

(Continued)

*Primary Examiner* — Chase E Leichliter
(74) *Attorney, Agent, or Firm* — Weaver Austin Villeneuve & Sampson LLP

(57) ABSTRACT

According to some implementations, when a triggering symbol lands in a defined area of a slot game display during an instance of a base game, there is a chance that the triggering symbol may change to a new symbol. If so, the new symbol may be held in the defined area and may persist during one or more additional purchased base game instances. The new symbol may persist if at least one additional triggering symbol lands in the defined area in subsequent bought games. Each additional triggering symbol may automatically change to a new symbol as the additional triggering symbol lands in the defined area of the slot game display. Whether the triggering symbol will change to a new symbol may involve a random component. In some examples, the greater the number of triggering symbols, the greater the probability the triggering symbol will change to the new symbol.

20 Claims, 18 Drawing Sheets

Related U.S. Application Data continuation of application No. 16/814,843, filed on Mar. 10, 2020, now Pat. No. 11,120,667, which is a continuation of application No. 29/712,616, filed on Nov. 9, 2019, now Pat. No. Des. 933,083.

(60) Provisional application No. 62/914,159, filed on Oct. 11, 2019, provisional application No. 62/900,396, filed on Sep. 13, 2019.

(56) References Cited

U.S. PATENT DOCUMENTS

| | | | | |
|---|---|---|---|---|
| D614,640 | S | 4/2010 | Megers | |
| D615,549 | S | 5/2010 | Caine | |
| 7,823,076 | B2 | 10/2010 | Borovsky | |
| D627,365 | S | 11/2010 | Brinda | |
| D636,785 | S | 4/2011 | Brinda | |
| D637,606 | S | 5/2011 | Luke | |
| D655,300 | S | 3/2012 | Jones | |
| D686,237 | S | 7/2013 | Alucema | |
| D698,813 | S | 2/2014 | Brown | |
| D701,227 | S | 3/2014 | Lee | |
| D701,520 | S | 3/2014 | Jung | |
| D705,800 | S | 5/2014 | Khanna | |
| D731,526 | S | 6/2015 | Chen | |
| D735,741 | S | 8/2015 | Kim | |
| D738,383 | S | 9/2015 | Lim | |
| D745,545 | S | 12/2015 | Lee | |
| D752,607 | S | 3/2016 | Zhang | |
| D757,067 | S | 5/2016 | Kim | |
| D765,101 | S | 8/2016 | Park | |
| D795,903 | S | 8/2017 | Chen | |
| D807,383 | S | 1/2018 | Hurst | |
| D815,129 | S | 4/2018 | Phillips | |
| D830,395 | S | 10/2018 | Phillips | |
| D865,811 | S | 11/2019 | Dagley | |
| 10,522,005 | B2 * | 12/2019 | Wortmann | G07F 17/3269 |
| D918,935 | S | 5/2021 | Tertzakian | |
| D918,953 | S | 5/2021 | Park | |
| D922,427 | S | 6/2021 | Yu | |
| 11,120,667 | B2 * | 9/2021 | Honeycutt | G07F 17/3269 |
| D933,083 | S | 10/2021 | Honeycut | |
| D938,440 | S | 12/2021 | Hawkins | |
| D938,446 | S | 12/2021 | Hawkins | |
| D949,167 | S | 4/2022 | Marks | |
| D952,646 | S | 5/2022 | Ludwick | |
| D967,837 | S | 10/2022 | Boese | |
| D973,696 | S | 12/2022 | Ludwick | |
| D974,386 | S | 1/2023 | Pryor | |
| D978,174 | S | 2/2023 | Marks | |
| D983,806 | S | 4/2023 | Mirjavadi | |
| 11,620,870 | B2 | 4/2023 | Penacho | |
| 11,625,982 | B2 | 4/2023 | La Guardia | |
| 11,688,247 | B2 * | 6/2023 | Honeycutt | G07F 17/3269 463/25 |
| 2001/0020950 | A1 | 9/2001 | Shimizu | |
| 2002/0014740 | A1 * | 2/2002 | Ainsworth | G07F 17/3244 273/139 |
| 2004/0072612 | A1 * | 4/2004 | Rodgers | G07F 17/3244 463/20 |
| 2005/0070354 | A1 * | 3/2005 | Baerlocher | G07F 17/3267 463/20 |
| 2005/0159208 | A1 * | 7/2005 | Pacey | G07F 17/3211 463/20 |
| 2005/0264523 | A1 | 12/2005 | Yoshida | |
| 2006/0107223 | A1 | 5/2006 | Mirtich | |
| 2007/0060248 | A1 * | 3/2007 | Rodgers | G07F 17/32 463/16 |
| 2007/0067738 | A1 | 3/2007 | Flynt | |
| 2008/0060004 | A1 | 3/2008 | Nelson | |
| 2009/0227345 | A1 * | 9/2009 | Yoshizawa | G07F 17/3244 463/20 |
| 2009/0227351 | A1 * | 9/2009 | Yoshizawa | G07F 17/34 463/20 |
| 2010/0125786 | A1 | 5/2010 | Ozawa | |
| 2010/0273550 | A1 * | 10/2010 | Marks | G07F 17/34 463/20 |
| 2013/0290116 | A1 | 10/2013 | Hepworth | |
| 2014/0162749 | A1 * | 6/2014 | Ryan | G07F 17/3213 463/20 |
| 2014/0337773 | A1 | 11/2014 | Phang | |
| 2015/0057068 | A1 * | 2/2015 | Burghard | G07F 17/3213 463/20 |
| 2015/0087393 | A1 * | 3/2015 | Jaffe | G07F 17/34 463/20 |
| 2015/0161853 | A1 * | 6/2015 | Ryan | G07F 17/34 463/20 |
| 2016/0232743 | A1 * | 8/2016 | Thomas | G07F 17/3213 |
| 2016/0292743 | A1 | 10/2016 | Deshpande | |
| 2016/0358412 | A1 * | 12/2016 | Eaton | G07F 17/3267 |
| 2017/0024957 | A1 * | 1/2017 | Boese | G07F 17/3213 |
| 2017/0084113 | A1 * | 3/2017 | Sanders | G07F 17/3225 |
| 2018/0061176 | A1 * | 3/2018 | Berman | G07F 17/3213 |
| 2018/0225926 | A1 * | 8/2018 | Wortmann | G07F 17/3267 |
| 2019/0051099 | A1 * | 2/2019 | Pawloski | G07F 17/3211 |
| 2019/0295376 | A1 * | 9/2019 | Ludwick | G07F 17/3211 |
| 2019/0392674 | A1 | 12/2019 | Hawkins | |
| 2021/0082252 | A1 * | 3/2021 | Honeycutt | G07F 17/3269 |
| 2021/0398393 | A1 * | 12/2021 | Honeycutt | G07F 17/3213 |

OTHER PUBLICATIONS

Notice of Allowance dated Jul. 28, 2021 for U.S. Appl. No. 29/712,616 (pp. 1-10).

Notice of Allowance dated May 17, 2021 for U.S. Appl. No. 16/814,843 (pp. 1-10).

Office Action dated Apr. 14, 2022 for U.S. Appl. No. 29/789,308 (pp. 1-7).

Office Action dated Mar. 31, 2021 for U.S. Appl. No. 16/814,843 (pp. 1-12).

Office Action (Non-Final Rejection) dated Dec. 23, 2022 for U.S. Appl. No. 17/446,927 (pp. 1-14).

Office Action (Notice of Allowance and Fees Due (PTOL-85)) dated Mar. 28, 2023 for U.S. Appl. No. 17/446,927 (pp. 1-8).

Notice of Allowance dated May 3, 2023 for U.S. Appl. No. 29/789,308 (pp. 1-7).

Notice of Allowance dated May 24, 2023 for U.S. Appl. No. 29/789,308 (pp. 1-2).

* cited by examiner

| DONS | PROB |
|---|---|
| 0 | p(0) |
| 1 | p(1) |
| 2 | p(2) |
| 3 | p(3) |
| 4 | p(4) |
| 5 | p(5) |
| 6 | p(6) |
| 7 | p(7) |
| 8 | p(8) |
| 9 | p(9) |
| 10 | p(10) |
| 11 | p(11) |
| 12 | p(12) |

FIG. 6A

| DONS | PROB |
|---|---|
| 0 | 20% |
| 1 | 10% |
| 2 | 10% |
| 3 | 20% |
| 4 | 20% |
| 5 | 30% |
| 6 | 30% |
| 7 | 40% |
| 8 | 40% |
| 9 | 50% |
| 10 | 50% |
| 11 | 60% |
| 12 | 60% |

FIG. 6B

| DONS | PROB |
|---|---|
| 0 | p(0) |
| 1 | p(1) |
| 2 | p(2) |
| 3 | p(3) |
| 4 | p(4) |
| 5 | p(5) |
| 6 | p(6) |
| 7 | p(7) |
| 8 | p(8) |
| 9 | p(9) |
| 10 | p(10) |
| 11 | p(11) |
| 12 | p(12) |

FIG. 9A

| DONS | PROB |
|---|---|
| 0 | 20% |
| 1 | 10% |
| 2 | 10% |
| 3 | 20% |
| 4 | 20% |
| 5 | 30% |
| 6 | 30% |
| 7 | 40% |
| 8 | 40% |
| 9 | 50% |
| 10 | 50% |
| 11 | 60% |
| 12 | 60% |

FIG. 9B

METAMORPHIC PERSISTENT SYMBOLS USING RANDOM PROBABILITY DISTRIBUTION

CROSS-REFERENCE TO RELATED APPLICATIONS

The present application claims priority to, and is a continuation of, U.S. patent application Ser. No. 17/446,927, filed on Sep. 3, 2021 and entitled "METAMORPHIC PERSISTENT SYMBOLS USING RANDOM PROBABILITY DISTRIBUTION," which claims priority to, and is a continuation of, U.S. patent application Ser. No. 16/814,843, filed on Mar. 10, 2021 and entitled "METAMORPHIC PERSISTENT SYMBOLS USING RANDOM PROBABILITY DISTRIBUTION," which claims priority to U.S. Provisional Patent Application Nos. 62/900,396, filed Sep. 13, 2019, and 62/914,159, filed Sep. Oct. 11, 2019, both titled "METAMORPHIC PERSISTENT SYMBOLS USING RANDOM PROBABILITY DISTRIBUTION", and claims priority to, and is a continuation-in-part, of U.S. patent application Ser. No. 29/712,616, filed on Nov. 9, 2019, and entitled "DISPLAY SCREEN OR PORTION THEREOF WITH GRAPHICAL USER INTERFACE," which are all hereby incorporated by reference herein in their entireties and for all purposes.

BACKGROUND

Electronic gaming machines ("EGMs") or gaming devices provide a variety of wagering games such as slot games, video poker games, video blackjack games, roulette games, video bingo games, keno games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical wagering games use a random number generator (RNG) to randomly determine the outcome of each game. The wagering game is designed to return a certain percentage of the amount wagered back to the player (RTP=return to player) over the course of many plays or instances of the game. The RTP and randomness of the RNG are critical to ensuring the fairness of the games and are, therefore, highly regulated. Upon initiation of play, the RNG randomly determines a game outcome and symbols are then selected which correspond to that outcome. Notably, some games may include an element of skill on the part of the player and are, therefore, not entirely random.

In existing gaming systems, feature games, secondary or bonus games, may be triggered for players in addition to the base game. A feature game gives players an additional opportunity to win prizes, or the opportunity to win larger prizes, than would otherwise be available in the base game. Feature games can also offer altered game play to enhance player enjoyment.

The popularity of such gaming machines with players is heavily dependent on the entertainment value of the machine relative to other gaming options and the player's gambling experience. Operators of gaming businesses therefore strive to provide the most entertaining, engaging, and exciting machines to attract customers to use the machines while also providing a machine that allows the player to enjoy their gambling experience. Accordingly, there is a continuing need for gaming machine manufacturers to develop new games in order to maintain or increase player enjoyment.

SUMMARY

One innovative aspect of the subject matter described in this disclosure may be implemented in an apparatus. The apparatus may include an interface system, a display system and a control system. In some examples, the apparatus may be a gaming device. The interface system may include at least one user interface.

The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system may be configured for receiving, via the user interface, an indication to initiate a game. The game may, in some examples, be a first purchased instance of a base game. The base game may be, or may include, a slot game. The control system may be configured for determining a first base game outcome and corresponding first display symbols. At least one of the first display symbols may be a first trigger symbol. Determining the first base game outcome may, in some examples, involve determining whether the first trigger symbol will be replaced with a higher-value symbol. Determining the first base game outcome may, in some such examples, involve determining whether the first trigger symbol will be replaced with a first wild symbol. However, in other examples the first trigger symbol may be a wild symbol. Determining the first base game outcome may, in some such examples, involve determining whether the wild symbol will be replaced with a higher-value symbol, such as a wild symbol with a multiplier. In yet other examples, the first trigger symbol may be a "prize on" symbol, which also may be referred to as a "what you see is what you get" or WYSIWYG symbol. Determining the first base game outcome may, in some such examples, involve determining whether the prize on symbol will be replaced with a higher-value symbol, such as a higher-value prize on symbol, a prize on symbol with a multiplier, etc.

The control system may be configured for controlling a display system of the gaming device to display the corresponding first display symbols at a plurality of display symbol positions on a display device of the display system. The plurality of display symbol positions may, in some examples, be arranged in a plurality of display symbol rows and display symbol columns. The first trigger symbol may be displayed in a first display symbol position.

If it is determined that the first trigger symbol will be replaced with a higher-value symbol, the control system may be configured for controlling the display system to replace the first trigger symbol with the higher-value symbol. If it is determined that the first trigger symbol will be replaced with the first wild symbol, the control system may be configured for controlling the display system to replace the first trigger symbol with the first wild symbol. The control system may be configured for controlling the display system to retain the first wild symbol (or other replacement symbol) in the first display symbol position during at least one subsequent purchased instance of a base game.

In some instances, the control system may be configured for controlling the display system to provide a prompt that the first wild symbol will be retained in the first display symbol position during at least one subsequent purchased instance of a base game.

In some examples, determining whether the first trigger symbol will be replaced with a higher-value symbol (such as the first wild symbol) may involve a random component. The random component may be linked to a set of probability distributions. The set of probability distributions may correspond to game outcomes, such as base game outcomes. The set of probability distributions may correspond to a number of triggering symbols that land in a defined area of the display symbol positions in the first base game outcome. In some examples, the defined area may correspond to particular rows and/or columns of a display symbol matrix. In some instances, a higher number of triggering symbols may correspond with a greater probability that the triggering symbol will change to the wild symbol. According to some examples, the defined area may include one or more display symbol columns. In some such examples, the plurality of display symbol positions may include five display symbol columns. According to some such examples, the defined area may include, or may be, display symbol columns two, three and four.

In some instances, the first wild symbol may indicate a first wild symbol credit value. According to some implementations, the control system may be configured for determining, a first credit award corresponding to the first base game outcome. Determining the first credit award may, in some instances, involve awarding the first wild symbol credit value regardless of whether the first wild symbol is part of a combination of winning symbols of the first base game outcome. In some such implementations, the control system may be configured for determining the first wild symbol credit value from among a plurality of wild symbol credit values. In some such implementations, determining whether the first trigger symbol will be replaced with the first wild symbol may involve a first RNG call and determining the first wild symbol credit value may involve a second RNG call.

According to some implementations, the control system may be configured for determining the first wild symbol type from among a plurality of wild symbol types. For example, the plurality of wild symbol credit types may include a multiplier wild symbol having a multiplier value. The multiplier wild symbol may be a wild symbol that causes an award to be multiplied by the multiplier value. The award may correspond to a combination of winning symbols that includes the multiplier wild symbol. Determining whether the first trigger symbol will be replaced with the first wild symbol may, for example, involve a first RNG call and determining the first wild symbol type may involve a second RNG call. Determining whether the first trigger symbol will be replaced with the first wild symbol and/or determining the first wild symbol type may be based, at least in part, on a display symbol row or a display symbol column of the first display symbol position. According to some implementations, the first wild symbol may be a first wild symbol type and the first trigger symbol may be a second wild symbol type.

According to some implementations, the control system may be configured for enlarging a playable area of the slot game display upon the occurrence of an enlargement triggering event. Enlarging the playable area may involve increasing a number of active display symbol positions. In some examples, the enlargement triggering event may correspond with a determination that the first trigger symbol will be replaced with the first wild symbol. In some instances, an enlargement of the playable area may persist during one or more additional purchased base game instances.

In some instances, the control system may be configured for receiving, via the user interface, an indication to initiate a second purchased instance of the base game and determining a second base game outcome and corresponding second display symbols. The control system may be configured for controlling the display system to retain the first wild symbol in the first display symbol position. The control system may be configured for controlling the display system to display the corresponding second display symbols at a plurality of display symbol positions on a display device of the display system. In some examples, the control system may be configured for determining a second credit award corresponding to the second base game outcome. Determining the second credit award may, in some instances in which the first wild symbol indicates a first wild symbol credit value, involve awarding the first wild symbol credit value regardless of whether the first wild symbol is part of a combination of winning symbols of the second base game outcome. If it is determined that at least one of the second display symbols is a second trigger symbol, the control system may be configured for controlling the display system to replace the second trigger symbol with a second wild symbol. The control system may be configured for controlling the display system to retain the second wild symbol in a second display symbol position during at least one subsequent purchased instance of a base game.

Still other innovative aspects of the subject matter described in this disclosure can be implemented in a gaming method. The method may involve receiving, via a user interface of a gaming device, an indication to initiate a game. The game may be a first purchased instance of a base game. The base game may be, or may include, a slot game. The method may involve determining, via a control system of the gaming device, a first base game outcome and corresponding first display symbols. At least one of the first display symbols may be a first trigger symbol. Determining the first base game outcome may involve determining whether the first trigger symbol will be replaced with a first wild symbol.

The method may involve controlling, via the control system, a display system of the gaming device to display the corresponding first display symbols at a plurality of display symbol positions on a display device of the display system. The plurality of display symbol positions may, in some examples, be arranged in a plurality of display symbol rows and display symbol columns. The first trigger symbol may be displayed in a first display symbol position.

If it is determined that the first trigger symbol will be replaced with the first wild symbol, the method may involve controlling, via the control system, the display system to replace the first trigger symbol with the first wild symbol. The method may involve controlling, via the control system, the display system to retain the first wild symbol in the first display symbol position during at least one subsequent purchased instance of a base game.

In some instances, the method may involve controlling, via the control system, the display system to provide a prompt that the first wild symbol will be retained in the first display symbol position during at least one subsequent purchased instance of a base game.

In some examples, determining whether the first trigger symbol will be replaced with the first wild symbol may involve a random component. The random component may be linked to a set of probability distributions. The set of probability distributions may correspond to game outcomes, such as base game outcomes. The set of probability distributions may correspond to a number of triggering symbols that land in a defined area of the display symbol positions in the first base game outcome. In some instances, a higher number of triggering symbols may correspond with a greater probability that the triggering symbol will change to the wild symbol. According to some examples, the defined area may include one or more display symbol columns. In some such examples, the plurality of display symbol positions may include five display symbol columns. According to some such examples, the defined area may include, or may be, display symbol columns two, three and four.

In some instances, the first wild symbol may indicate a first wild symbol credit value. According to some implementations, the method may involve determining, via the control system, a first credit award corresponding to the first base game outcome. Determining the first credit award may, in some instances, involve awarding the first wild symbol credit value regardless of whether the first wild symbol is part of a combination of winning symbols of the first base game outcome. Some such examples may involve determining, via the control system, the first wild symbol credit value from among a plurality of wild symbol credit values. In some such implementations, determining whether the first trigger symbol will be replaced with the first wild symbol may involve a first RNG call and determining the first wild symbol credit value may involve a second RNG call.

Some implementations may involve determining, via the control system, the first wild symbol type from among a plurality of wild symbol types. For example, the plurality of wild symbol credit types may include a multiplier wild symbol having a multiplier value. The multiplier wild symbol may be a wild symbol that causes an award to be multiplied by the multiplier value. The award may correspond to a combination of winning symbols that includes the multiplier wild symbol. Determining whether the first trigger symbol will be replaced with the first wild symbol may, for example, involve a first RNG call and determining the first wild symbol type may involve a second RNG call. Determining whether the first trigger symbol will be replaced with the first wild symbol and/or determining the first wild symbol type may be based, at least in part, on a display symbol row or a display symbol column of the first display symbol position. According to some implementations, the first wild symbol may be a first wild symbol type and the first trigger symbol may be a second wild symbol type.

According to some implementations, the method may involve enlarging a playable area of the slot game display upon the occurrence of an enlargement triggering event. Enlarging the playable area may involve increasing a number of active display symbol positions. In some examples, the enlargement triggering event may correspond with a determination that the first trigger symbol will be replaced with the first wild symbol. In some instances, an enlargement of the playable area may persist during one or more additional purchased base game instances.

In some instances, the method may involve receiving, via the user interface, an indication to initiate a second purchased instance of the base game and determining, via the control system, a second base game outcome and corresponding second display symbols. The method may involve controlling, via the control system, the display system to retain the first wild symbol in the first display symbol position. The method may involve controlling, via the control system, the display system to display the corresponding second display symbols at a plurality of display symbol positions on a display device of the display system. In some examples, the method may involve determining, via the control system, a second credit award corresponding to the second base game outcome. Determining the second credit award may, in some instances in which the first wild symbol indicates a first wild symbol credit value, involve awarding the first wild symbol credit value regardless of whether the first wild symbol is part of a combination of winning symbols of the second base game outcome. If it is determined that at least one of the second display symbols is a second trigger symbol, the method may involve controlling, via the control system, the display system to replace the second trigger symbol with a second wild symbol. The method may involve controlling, via the control system, the display system to retain the second wild symbol in a second display symbol position during at least one subsequent purchased instance of a base game.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon.

For example, the software may include instructions for controlling one or more devices to perform a gaming method. In some examples, the method may involve receiving, via a user interface of a gaming device, an indication to initiate a game. The game may be a first purchased instance of a base game. The base game may be, or may include, a slot game. The method may involve determining, via a control system of the gaming device, a first base game outcome and corresponding first display symbols. At least one of the first display symbols may be a first trigger symbol. Determining the first base game outcome may involve determining whether the first trigger symbol will be replaced with a first wild symbol.

The method may involve controlling, via the control system, a display system of the gaming device to display the corresponding first display symbols at a plurality of display symbol positions on a display device of the display system. The plurality of display symbol positions may, in some examples, be arranged in a plurality of display symbol rows and display symbol columns. The first trigger symbol may be displayed in a first display symbol position.

If it is determined that the first trigger symbol will be replaced with the first wild symbol, the method may involve controlling, via the control system, the display system to replace the first trigger symbol with the first wild symbol. The method may involve controlling, via the control system, the display system to retain the first wild symbol in the first display symbol position during at least one subsequent purchased instance of a base game.

In some instances, the method may involve controlling, via the control system, the display system to provide a prompt that the first wild symbol will be retained in the first display symbol position during at least one subsequent purchased instance of a base game.

In some examples, determining whether the first trigger symbol will be replaced with the first wild symbol may involve a random component. The random component may be linked to a set of probability distributions. The set of probability distributions may correspond to game outcomes, such as base game outcomes. The set of probability distributions may correspond to a number of triggering symbols that land in a defined area of the display symbol positions in the first base game outcome. In some instances, a higher number of triggering symbols may correspond with a greater probability that the triggering symbol will change to the wild symbol. According to some examples, the defined area may include one or more display symbol columns. In some such examples, the plurality of display symbol positions may include five display symbol columns. According to some such examples, the defined area may include, or may be, display symbol columns two, three and four.

In some instances, the first wild symbol may indicate a first wild symbol credit value. According to some implementations, the method may involve determining, via the control system, a first credit award corresponding to the first base game outcome. Determining the first credit award may, in some instances, involve awarding the first wild symbol credit value regardless of whether the first wild symbol is part of a combination of winning symbols of the first base game outcome. Some such examples may involve determining, via the control system, the first wild symbol credit value from among a plurality of wild symbol credit values. In some such implementations, determining whether the first trigger symbol will be replaced with the first wild symbol may involve a first RNG call and determining the first wild symbol credit value may involve a second RNG call.

Some implementations may involve determining, via the control system, the first wild symbol type from among a plurality of wild symbol types. For example, the plurality of wild symbol credit types may include a multiplier wild symbol having a multiplier value. The multiplier wild symbol may be a wild symbol that causes an award to be multiplied by the multiplier value. The award may correspond to a combination of winning symbols that includes the multiplier wild symbol. Determining whether the first trigger symbol will be replaced with the first wild symbol may, for example, involve a first RNG call and determining the first wild symbol type may involve a second RNG call. Determining whether the first trigger symbol will be replaced with the first wild symbol and/or determining the first wild symbol type may be based, at least in part, on a display symbol row or a display symbol column of the first display symbol position. According to some implementations, the first wild symbol may be a first wild symbol type and the first trigger symbol may be a second wild symbol type.

According to some implementations, the method may involve enlarging a playable area of the slot game display upon the occurrence of an enlargement triggering event. Enlarging the playable area may involve increasing a number of active display symbol positions. In some examples, the enlargement triggering event may correspond with a determination that the first trigger symbol will be replaced with the first wild symbol. In some instances, an enlargement of the playable area may persist during one or more additional purchased base game instances.

In some instances, the method may involve receiving, via the user interface, an indication to initiate a second purchased instance of the base game and determining, via the control system, a second base game outcome and corresponding second display symbols. The method may involve controlling, via the control system, the display system to retain the first wild symbol in the first display symbol position. The method may involve controlling, via the control system, the display system to display the corresponding second display symbols at a plurality of display symbol positions on a display device of the display system. In some examples, the method may involve determining, via the control system, a second credit award corresponding to the second base game outcome. Determining the second credit award may, in some instances in which the first wild symbol indicates a first wild symbol credit value, involve awarding the first wild symbol credit value regardless of whether the first wild symbol is part of a combination of winning symbols of the second base game outcome. If it is determined that at least one of the second display symbols is a second trigger symbol, the method may involve controlling, via the control system, the display system to replace the second trigger symbol with a second wild symbol. The method may involve controlling, via the control system, the display system to retain the second wild symbol in a second display symbol position during at least one subsequent purchased instance of a base game.

BRIEF DESCRIPTION OF THE DRAWINGS

Features and advantages of certain embodiments of the present disclosure will become apparent from the following description of embodiments thereof, by way of example only, with reference to the accompanying drawings, in which;

FIGS. 6A and 6B show examples of probability distributions for having a triggering symbol change to a wild symbol.

FIGS. 9A and 9B show examples of probability distributions for having a triggering symbol change to a wild symbol having a credit value.

Figure 1:
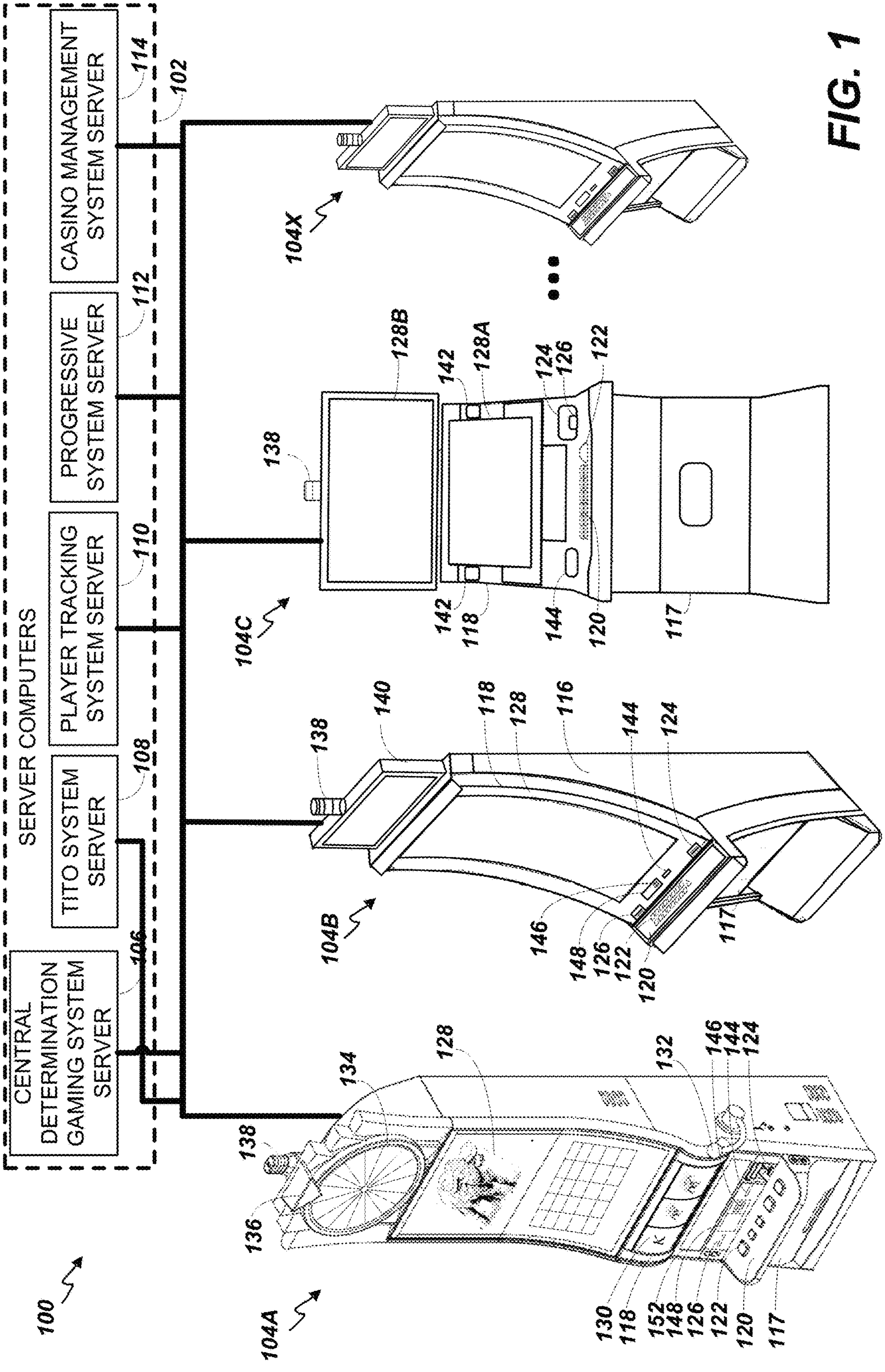
FIG. 1 is an example diagram showing several EGMs networked with various gaming-related servers.

The foregoing summary, as well as the following detailed description of certain embodiments of the present disclosure, will be better understood when read in conjunction with the appended drawings. For the purpose of illustrating the disclosure, certain embodiments are shown in the drawings. It should be understood, however, that the present invention is not limited to the arrangements and instrumentality shown in the attached drawings.

DETAILED DESCRIPTION

According to some implementations, when a triggering symbol lands in a defined area of a slot game display during an instance of a base game, there is a chance that the triggering symbol may change to another symbol, which may be referred to herein as a "new symbol." In some alternative examples, the game may be a feature or bonus game, e.g., a free game. According to some implementations, the new symbol may be a wild symbol. In some examples, the new symbol may be a higher-paying symbol. For example, the trigger symbol may be a "prize on" symbol, sometimes referred to as a "what you see is what you get" or WYSIWYG symbol, the value of which is indicated on the symbol. In some examples, the new symbol may be a higher-paying "prize on" symbol. In some instances, the new symbol may be a symbol that represents a feature trigger. In some instances, there may be more than one type of new symbol.

If the triggering symbol changes to a new symbol, the new symbol may be held in the defined area of the slot game display and may persist during one or more additional game instances. According to some examples, the additional game instances are purchased base game instances. In some such implementations the new symbol will persist if at least one additional triggering symbol lands in the defined area of the slot game display in subsequent bought games. In some such examples, each additional triggering symbol may automatically change to a new symbol as the additional triggering symbol lands in the defined area of the slot game display.

Whether the triggering symbol will change to a new symbol may involve a random component. The random component may be linked to a set of probability distributions. The probability distributions may correspond to base game outcomes. For example, the probability distributions may correspond to the number of triggering symbols that land in the defined area of the slot game display. According to some such examples, the greater the number of triggering symbols, the greater the probability the triggering symbol will change to the new symbol.

Some implementations also may involve enlarging the playable area of the slot game display upon the occurrence of an enlargement triggering event. In some instances, the enlargement triggering event may correspond with one or more triggering symbols changing to new symbols. In some such examples, if a triggering symbol lands and changes to a new symbol, the new symbol will be held in the defined area of the slot game display and will persist during one or more additional purchased base game instances, and the enlargement of the playable area will also persist during the one or more additional purchased base game instances. However, some implementations may involve enlarging the playable area of the slot game display, at least temporarily, even if no trigger symbols land during an outcome of a base game instance.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console, although such devices may require specialized software and/or hardware to comply with regulatory requirements regarding devices used for wagering or games of chance in which monetary awards are provided.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the server computers 102 described herein.

Moreover, in some implementations at least some of the EGMs may be "thin-client" or "thick-client" EGMs that are not configured for stand-alone determination of game outcomes, etc. Such client EGMs may be configured for communication with one or more of the different server computers 102 described herein, including but not limited to the central determination gaming system server 106. Some such client EGMs may, for example, be configured to accept tickets and/or cash (e.g., via a bill validator that also functions as a ticket reader) to load credits onto the client EGM, a "ticket-out" printer for outputting a credit ticket when a cash out button is pressed, a player tracking card reader, etc. Some client EGMs may include a transceiver for wireless communication with a player's mobile device, (e.g., for communication with a player's smartphone, tablet and/or mobile gaming device) a keypad 146, and/or an illuminated display 148 for reading, receiving, entering, and/or displaying player tracking information. A client EGM may include a display system, an audio system, etc., for presenting attract sequences, game presentations, etc. The game presentations may include game outcomes determined by another device, such as the central determination gaming system server 106.

The server computers 102 also may include a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over a network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 117 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 127 which may be used to determine an outcome to the game.

In many configurations, the gaming device 104A may have a main display 128 (e.g., video display monitor) mounted to, or above, the gaming display area 127. The main display 128 can be, e.g., a high-resolution LCD, plasma, LED, or OLED panel which may be flat or curved as shown, a cathode ray tube, or other conventional electronically controlled video monitor. The main display 128 may be of one or more various orientations (i.e., landscape or portrait), aspect ratios and resolutions. In some implementations, the main display 128 may include a touchscreen.

In some embodiments, the bill validator 124 may also function as a "ticket-in" reader that allows the player to use a casino-issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems may be used to generate and track unique bar-codes or other indicators printed on tickets to allow players to avoid the use of bills and coins by loading credits using a ticket reader and cashing out credits using a ticket-out printer 126 on the gaming device 104A. The gaming device 104A may have hardware meters for purposes including ensuring regulatory compliance and monitoring the player credit balance. In addition, there can be additional meters that record the total amount of money wagered on the gaming machine, total amount of money deposited, total amount of money withdrawn, and total amount of winnings on gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in the EGM 104A. In such embodiments, a game controller (not shown in FIG. 1) within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2A:
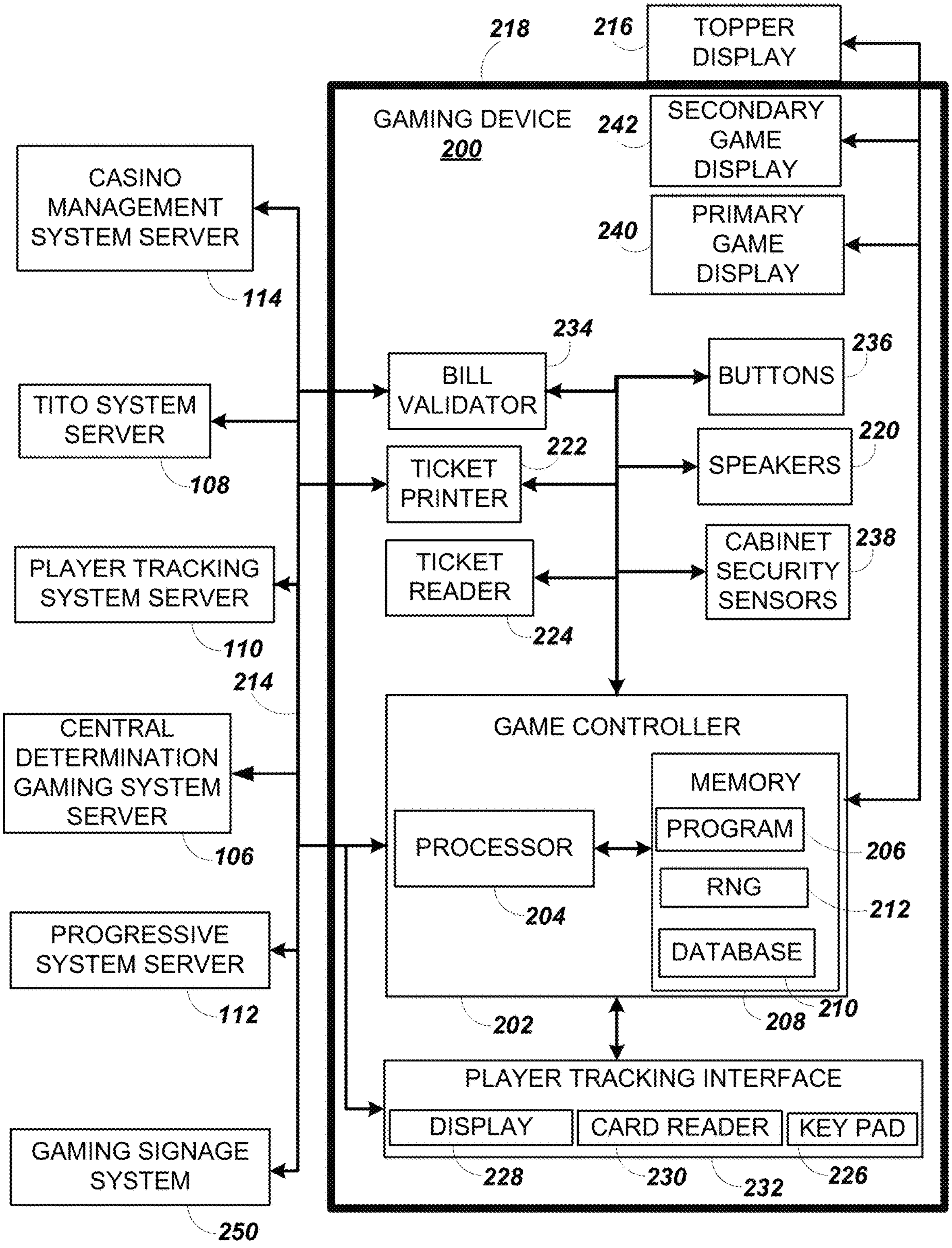
FIG. 2A is a block diagram showing various functional elements of an example EGM.

Many or all of the above-described components can be controlled by circuitry (e.g., a gaming controller) housed inside the main cabinet 116 of the gaming device 104A, the details of which are shown in FIG. 2A.

Note that not all gaming devices that are suitable for implementing embodiments of the present disclosure necessarily include top wheels, top boxes, information panels, cashless ticket systems, and/or player tracking systems. Further, some suitable gaming devices may have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that, where possible, reference numerals identifying similar features of the gaming device 104A embodiment are also identified in the gaming device 104B embodiment using the same reference numbers. Gaming device 104B does not include physical reels, but instead shows game play functions on main display 128. An optional topper screen 140 may be used as a secondary game display for bonus play to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 117 which opens to provide access to the interior of the gaming device 104B. The main or service door 117 is typically used by service personnel to refill the ticket-out printer 126 and collect bills and tickets inserted into the bill validator 124. The door 117 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape-style main display 128A may have a curvature radius from top to bottom, or alternatively, from side to side. In some embodiments, main display 128A is a flat panel display. Main display 128A is typically used for primary game play while secondary display 128B is typically used for a bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class II or Class III, etc.

FIG. 2A is a block diagram depicting examples of internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (a play or round of the game) may be generated on a remote gaming device such as the central determination gaming system server 106 (not shown in FIG. 2A but shown in FIG. 1). The game instance may be communicated to gaming device 200 via the network 214 and then displayed on gaming device 200. Gaming device 200 may execute game software, such as, but not limited to, video streaming software that allows the game to be displayed on gaming device 200. When a game is stored on gaming device 200, it may be loaded from the memory 208 (e.g., from a read only memory (ROM)) or from the central determination gaming system server 106 to memory 208. The memory 208 may include random access memory (RAM), ROM or another form of storage media that stores instructions for execution by the processor 204.

The gaming device 200 may include a topper display 216 or another form of a top box (e.g., a topper wheel, a topper screen, etc.) which sits above main cabinet 218. The cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), and a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Some gaming devices, such as gaming devices 104A-104X, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming device 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gaming machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player can view the game outcome on the primary game display 240 and/or the secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using a player interface system, which may include the player input buttons 236, the primary game display 240 (which may include a touch screen), or some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

In this example, the gaming device 200 is also configured for communication with a gaming signage system 250 via the network 214. Various examples of gaming signage systems 250 are provided herein. According to some examples, the gaming signage system 250 may be configured for communication with other elements of a gaming system via the network 214, such as the central determination gaming system server 106, the progressive system server 112, the player tracking system server 110 the casino management system server 114 and/or the TITO system server 108.

When the player is done, he/she cashes out the credit balance (typically by pressing a cash-out button to receive a ticket from the ticket printer 222). The ticket may be redeemed for money or inserted into another machine to establish a credit balance for play.

While an example gaming device 200 has been described in regard to FIG. 2A, certain aspects of the present disclosure may be implemented by gaming devices that lack one or more of the above-described components. For example, not all gaming devices suitable for implementing aspects of the present disclosure necessarily include top boxes, information panels, cashless ticket systems, and/or player tracking systems. Further, some suitable gaming devices may include a single game display having mechanical reels or a video display. Moreover, other embodiments may be designed for bar tables and have displays that face upwards.

Many different types of wagering games, including mechanical slot games, video slot games, video poker, video black jack, video pachinko, keno, bingo, and lottery, may be provided by the gaming device 200. In particular, the gaming device 200 may be operable to provide many different instances of games of chance. The instances may be differentiated according to themes, sounds, graphics, type of game (e.g., slot game vs. card game vs. game with aspects of skill), denomination, number of paylines, maximum jackpot, progressive or non-progressive, bonus games, class 2 or class 3, etc.

The gaming device 200 may allow a player to select a game of chance, skill, or combination thereof, to play from a plurality of instances available on the gaming device 200. For example, the gaming device 200 may provide a menu with a list of the instances of games that are available for play on the gaming device 200 and a player may be able to select, from the list, a game that they wish to play.

Figure 2B:
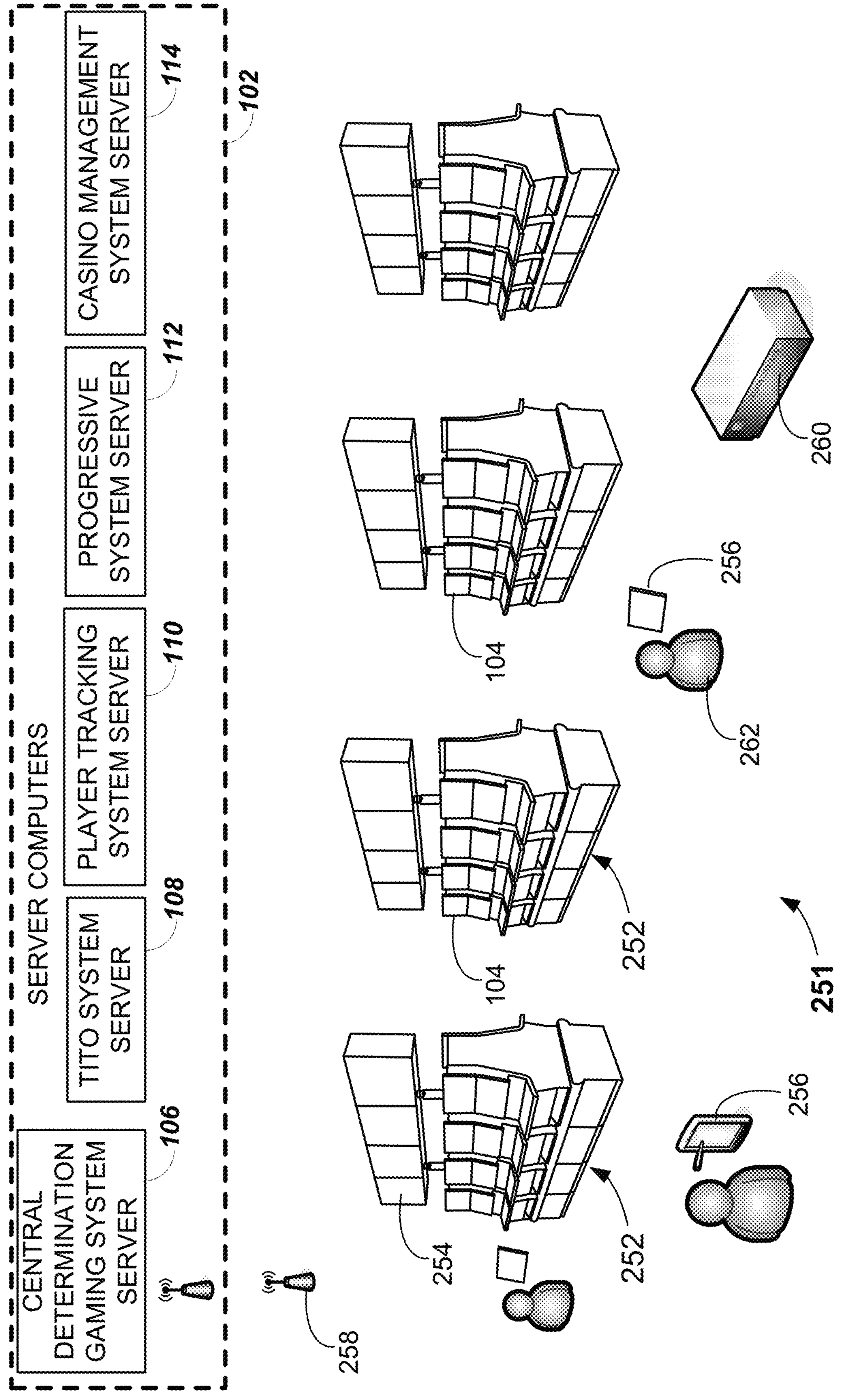
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254. According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
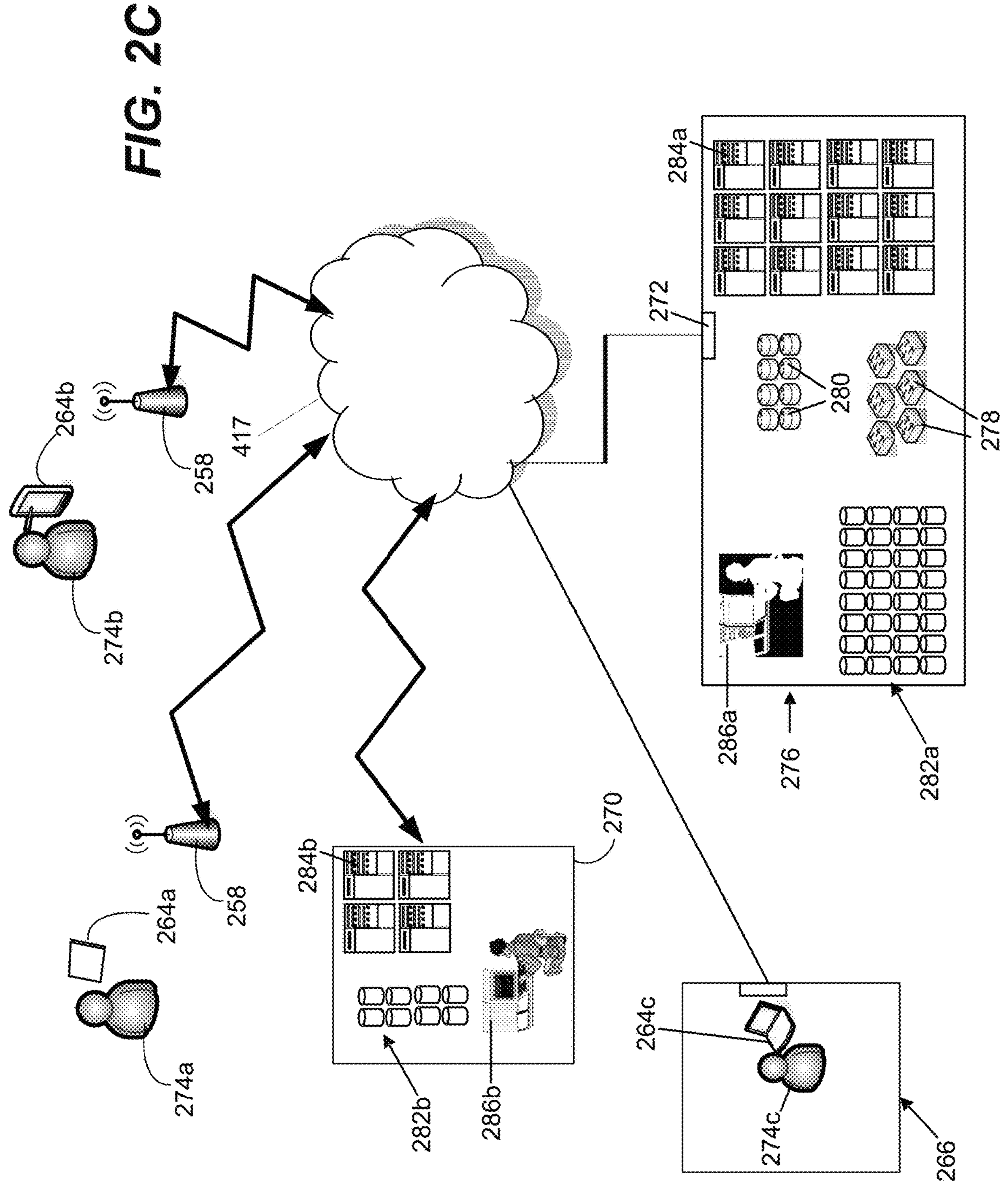
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
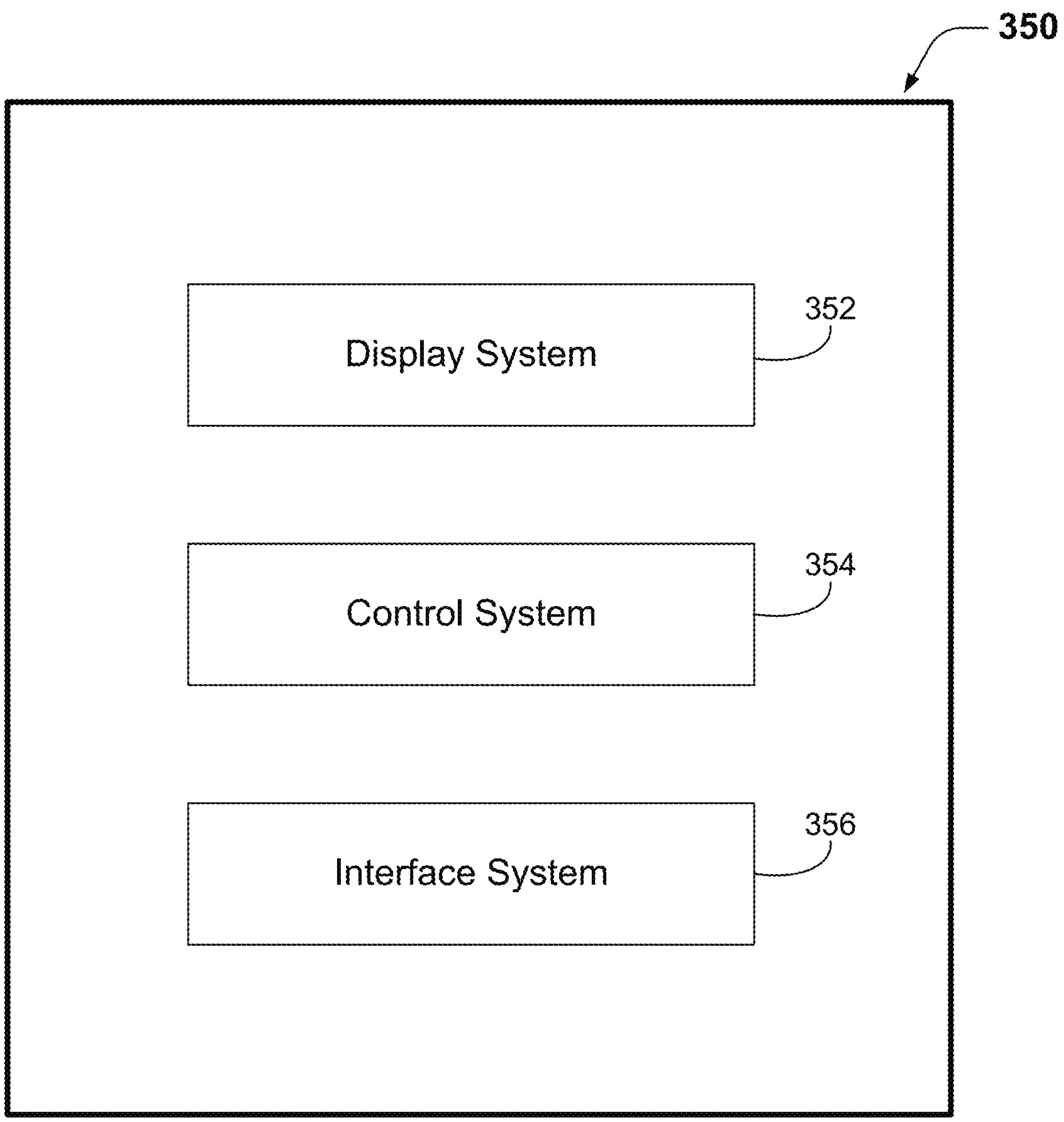
FIG. 3 is a block diagram that shows blocks of an apparatus according to one example.

FIG. 3 is a block diagram that shows blocks of an apparatus according to one example. According to some examples, the apparatus 350 may be, or may include, a gaming device. In some examples, the apparatus 350 may be an EGM such as those described above with reference to FIGS. 1 and 2A. However, in alternative examples, the apparatus 350 may be a mobile device such as described above with reference to FIG. 2B or an EUD as described above with reference to FIG. 2C.

In this example, the apparatus 350 includes a display system 352 and a control system 354 that is configured to communicate with the display system 352. In this example, the control system 354 is configured to communicate with the display system 352 via wired communication, e.g., via electrical signals. In alternative implementations, the control system 354 may be configured to communicate with the display system 352 via wireless communication. Accordingly, at least a portion of the control system 354 may be coupled to the display system 352. As used herein, the term "coupled to" has a meaning that could include being physically coupled for wired communication or being configured for wireless communication.

The control system 354 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. Although the interface system 356 is shown as being separate from the control system 354, in some implementations the interface system 356 may be part of the control system 354. In some implementations, the interface system 356 may include the entire control system 354. The control system 354 also may include (and/or be configured for communication with) one or more memory devices, such as one or more random access memory (RAM) devices, read-only memory (ROM) devices and/or other types of non-transitory media. In some implementations, at least a portion of the control system 354 may be implemented as a register. Accordingly, the apparatus 350 may have a memory system that includes one or more memory devices, though the memory system is not shown in FIG. 3.

The control system 354 may be capable of performing, at least in part, the methods disclosed herein. In some examples, the control system 354 may be capable of performing at least some of the methods described herein according to instructions (e.g., software) stored on one or more non-transitory media. For example, the control system 354 may be configured for controlling the display system 352 and/or for receiving and processing data from at least a portion of the display system 352, e.g., as described below.

The display system 352 may include, one or more liquid crystal displays (LCDs), plasma displays, light-emitting diode (LED) displays, microLED displays or organic light-emitting diode (OLED) displays. According to some implementations, the display system 352 may include at least one flexible display, such as a flexible OLED. Although shown as separate components in FIG. 3, the display system 352 may, in some examples, include at least a portion of the control system 354. For example, the display system 352 may include one or more processors, microprocessors, programmable logic devices, discrete gates or transistor logic, etc.

In the example shown in FIG. 3, the apparatus 350 includes an interface system 356. In some examples, the interface system may include a wireless interface system. In some implementations, the interface system 356 may include a network interface, an interface between the control system 354 and the display system 352, an interface between the control system 354 and a memory system and/or an interface between the control system 354 and an external device interface (e.g., a port or an applications processor). In some examples, the interface system 356 may include one or more user interfaces, such as a touch screen, one or more buttons, a gesture recognition system, a voice recognition system, etc.

According to some implementations, the apparatus 350 may be a single device, whereas in other implementations the apparatus 350 may be a system that includes more than one device. Accordingly, the terms "apparatus" and "system" may sometimes be used interchangeably herein. In other examples, the apparatus 350 may be a component of another device. For example, in some implementations at least a portion of the display system 352 and/or the control system 354 may be included in more than one apparatus. For example, in some implementations at least part of the control system 354 may reside in a server, such as a central determination server, a server that tracks feature award credits, etc. Some implementations of the apparatus 350 may not include a display system. In some such implementations, the control system 354 may be configured for controlling the display system of another device.

Figure 4:
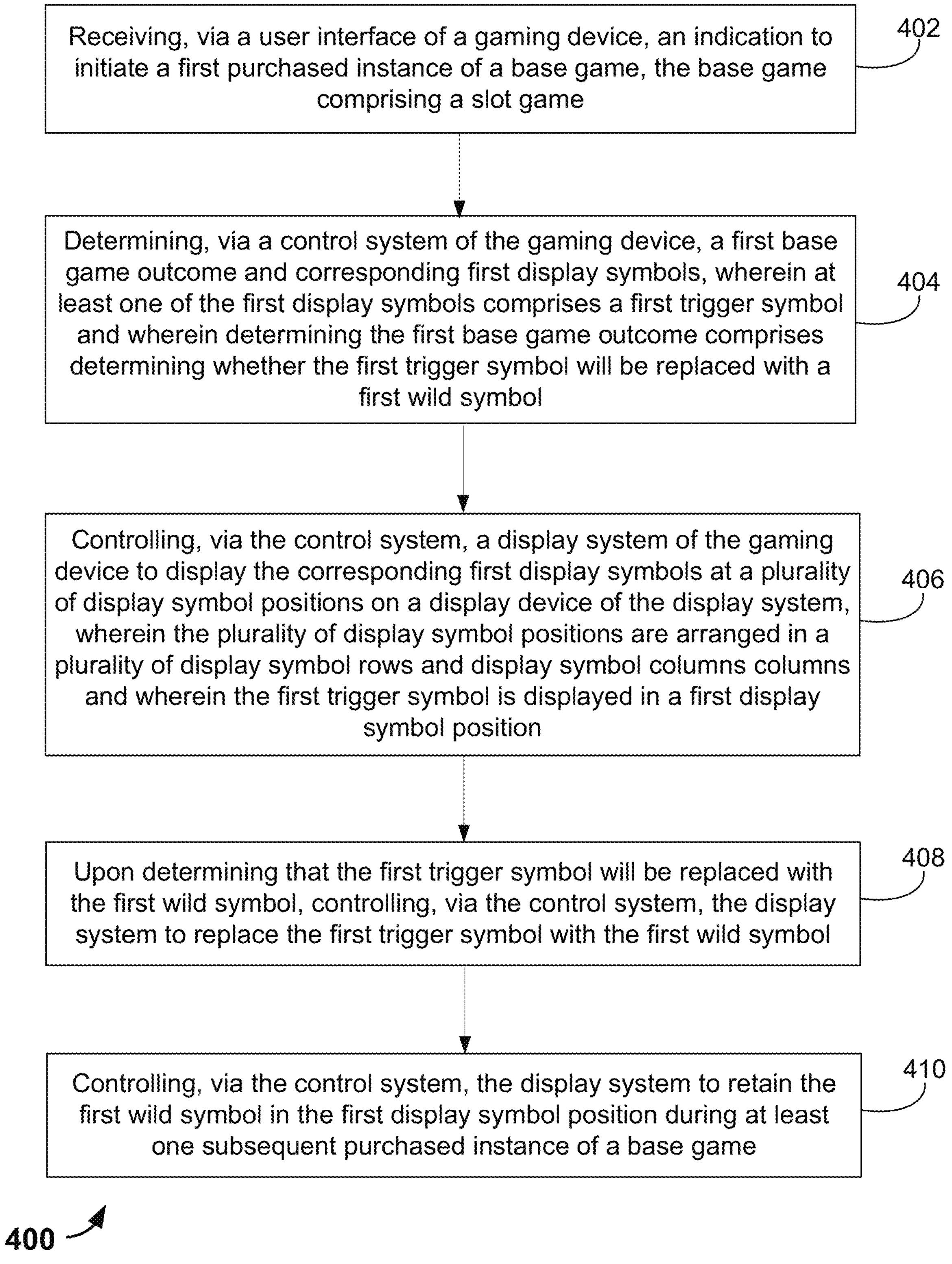
FIG. 4 is a flow diagram that shows blocks of a method according to one example.

FIG. 4 is a flow diagram that shows blocks of a method according to one example. In some examples method 400 may be performed, at least in part, by an apparatus such as that described above with reference to FIG. 3. In some examples, the method 400 may be performed by a control system (e.g., the control system 354 of FIG. 3) according to software stored upon one or more non-transitory storage media. As with other methods described herein, the number and sequence of blocks shown in FIG. 4 are merely examples. Similar disclosed methods may include more or fewer blocks. Moreover, at least some of the blocks may occur in a different sequence than the sequence that is shown in a flow diagram.

According to this example, block 402 involves receiving, via a user interface of a gaming device, an indication to initiate a first purchased instance of a base game. In some alternative examples, the game may be a feature or bonus game, e.g., a free game. However, in this particular example the game is a base game and is, or includes, a slot game. For example, the user input may be received by the control system 354 of FIG. 3, via a user interface of the interface system 356. Block 402 may, for example, involve receiving an indication that a user has pressed a "play" button of an EGM, receiving an indication that the user has touched an area of a touch screen that corresponds to a displayed image of a "play" button, etc. In some such implementations, block

402 may involve verifying that there is sufficient credit for at least one instance of the base game.

According to this implementation, block 404 involves determining, via a control system of the gaming device, a first base game outcome and corresponding first display symbols. In this context, the term “first” does not necessarily indicate that this is actually the first base game instance of a wager gaming session. Instead, the term “first” is merely used to distinguish some details of a particular base game instance from other, subsequent base game instances. The display symbols may, for example, be selected from a symbol set that includes trigger symbols and non-trigger symbols. According to some examples, the symbol set may include one or more types of wild symbols.

In this example, at least one of the first display symbols comprises a first trigger symbol. In some instances, more than one of the first display symbols may be trigger symbols and in other instances the base game outcome may include no trigger symbols.

According to this example, determining the first base game outcome also involves determining whether the first trigger symbol will be replaced with a new symbol, which is a wild symbol in this example. In some examples, block 404 may involve determining whether other trigger symbols of the base game outcome will be replaced with a new symbol. In some such examples, block 404 may involve determining that either all of the trigger symbols will be replaced with new symbols or none of the trigger symbols will be replaced with new symbols. However, in alternative implementations block 404 may involve determining that some of the trigger symbols will be replaced with new symbols and that other trigger symbols will not be replaced with new symbols.

In some implementations, determining whether the first trigger symbol will be replaced with the first wild symbol may involve a random component. According to some such implementations, the random component may be linked to a set of probability distributions. The set of probability distributions may, for example, correspond to base game outcomes.

In some examples, the set of probability distributions may correspond to a number of triggering symbols that land in a defined area of the display symbol positions in the first base game outcome. According to some such examples, the defined area may be a subset of the total number of display symbol positions, such as particular rows and/or particular columns of display symbol positions. In some such examples, a higher number of triggering symbols may correspond with a greater probability that the triggering symbol will change to the wild symbol.

In some examples, block 404 may involve determining whether a playable area of the slot game display will be enlarged. Enlarging the playable area may involve increasing a number of active display symbol positions, e.g., by adding one or more rows and/or one or more columns. In some such examples, block 404 may involve determining whether an enlargement triggering event has occurred. According to some such examples, the enlargement triggering event may correspond with a determination that one or more trigger symbols will be replaced with new symbols. The enlargement triggering event may correspond with replacing the first trigger symbol with the first wild symbol.

However, in some implementations it may be determined in block 404 that the playable area of the slot game display will be enlarged even if it is determined in block 404 that the base game outcome does not include landing any trigger symbols. According to some such implementations, there may be a non-zero probability that that the playable area of the slot game display will be enlarged even if no trigger symbols land.

According to this implementation, block 406 involves controlling, via the control system, a display system of the gaming device to display the corresponding first display symbols at a plurality of display symbol positions on a display device of the display system. In this example, the first trigger symbol is displayed in a first display symbol position. According to this example the plurality of display symbol positions are arranged in a plurality of display symbol rows and display symbol columns. Display symbol columns may sometimes be referred to herein as “reels,” whether or not actual physical reels are used to present the display symbol columns. However, in other implementations the plurality of display symbol positions may be arranged in another manner, e.g., along arcuate shapes, along lines that radiate from one or more central points, etc.

In this example, if it is determined in block 404 that the first trigger symbol will be replaced with a first wild symbol, block 408 involves controlling, via the control system, the display system to replace the first trigger symbol with the first wild symbol.

According to this example, block 410 involves retaining the first wild symbol in the first display symbol position during at least one subsequent purchased instance of a base game. In this instance, block 410 involves controlling, via the control system, the display system to retain the first wild symbol in the first display symbol position during at least one subsequent purchased instance of a base game.

In some examples, method 400 may involve controlling, via the control system, the display system to provide a prompt that the first wild symbol will be retained in the first display symbol position during at least one subsequent purchased instance of a base game. The prompt may be accompanied by visual and/or audio effects that are intended to enhance player excitement, which may be related to aspects of the base game.

In some instances, a player will respond favorably and will decide to keep playing the base game. According to some such examples, method 400 may involve receiving, via the user interface, an indication to initiate a second purchased instance of the base game. Method 400 may involve determining, via a control system of the gaming device, a second base game outcome and corresponding second display symbols. Method 400 may involve controlling, via the control system, the display system to display the corresponding second display symbols at a plurality of display symbol positions on a display device of the display system. Method 400 may involve controlling the display system to retain the first wild symbol in the first display symbol position during this process.

The second base game outcome may or may not include an additional trigger symbols. However, if it is determined that at least one of the second display symbols is a trigger symbol, method 400 may involve controlling, via the control system, the display system to replace the second trigger symbol with a second wild symbol. Method 400 may involve controlling the display system to retain the second wild symbol in a second display symbol position during at least one subsequent purchased instance of a base game.

Figure 5A:
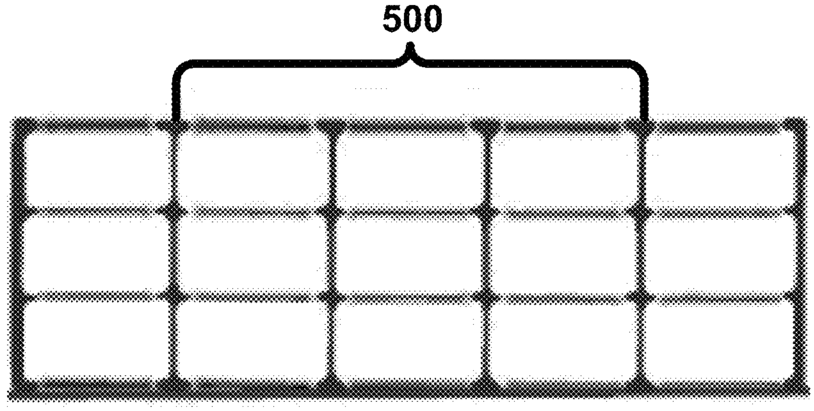
FIGS. 5A-5C show examples of displays that may be presented during a purchased base game according to one example of the method of FIG. 4.
Figure 5B:
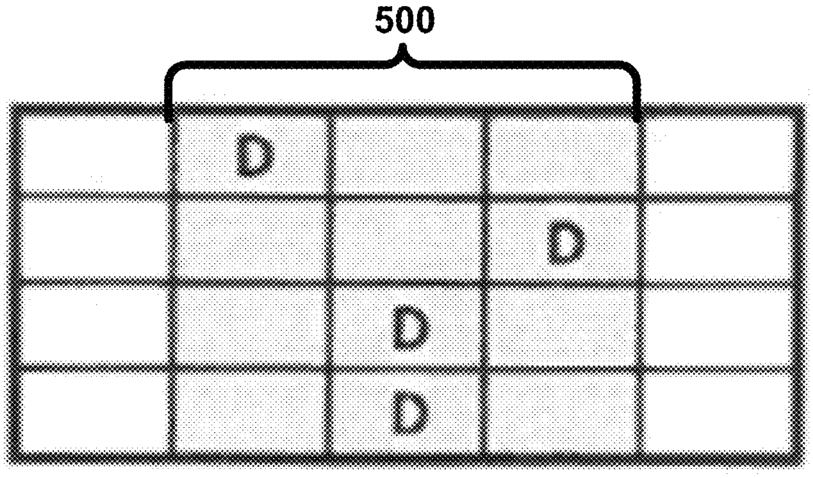
Figure 5C:
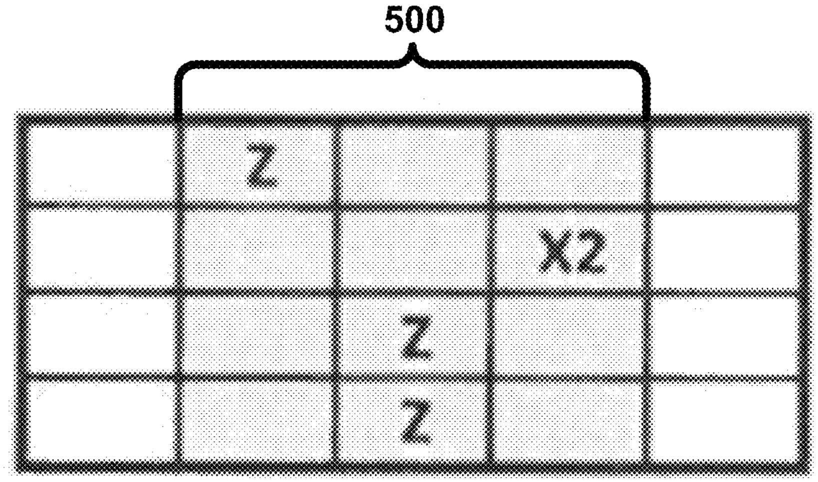

FIGS. 5A-5C show examples of displays that may be presented during a purchased base game according to one example of the method of FIG. 4. In some alternative examples, the game may be a feature or bonus game, e.g., a free game. In this example, the base game has a Zorro theme. As shown in FIG. 5A, the base game is a five-reel slot game.

Accordingly, in this example the display symbol positions are initially arranged in 3 display symbol rows and 5 display symbol columns. In some alternative examples, the display symbol positions may be initially arranged in different numbers of display symbol rows and display symbol columns, e.g., 4 display symbol rows and 5 display symbol columns, 4 display symbol rows and 6 display symbol columns, etc. FIG. 5A shows an example of the display symbol positions before a particular base game instance has started.

FIG. 5B shows an example of trigger symbols that have landed in a defined area of the display symbol positions during a presentation of a first base game outcome. In this instance, the defined area 500 includes the three center display symbol columns or "reels," reels 2, 3 and 4. According to this example, the trigger symbols are "Don" symbols, each of which is represented by a "D" in FIG. 5B.

In this example, the control system has determined that a playable area of the slot game display will be enlarged: the control system has caused another row of display symbol positions to be presented on the display. The defined area 500 now includes three additional display symbol positions. This increases the player's chances of having more "Dons" land during subsequent base game instances, thereby remaining in a bonus mode in which the playable area of the slot game display is enlarged.

When a Don symbol lands in the defined area 500, the Don symbol may randomly change to a "Zorro Wild" symbol (represented as a "Z" in FIG. 5C) or "Zorro Wild X2" symbol (represented as "X2" in FIG. 5C). In this example, a Zorro Wild X2 symbol is both a wild symbol and a multiplier symbol, with a multiplier value of 2. Some implementations may include other types of wild symbols, including but not limited to other types of wild multiplier symbols, wild "prize on" symbols, etc. According to this implementation, a higher number of triggering symbols corresponds with a greater probability that the triggering symbol will change to a wild symbol.

FIGS. 6A and 6B show examples of probability distributions for having a triggering symbol change to a wild symbol. In these examples, the probability distributions also correspond to the probability that a playable area of the slot game display will be enlarged. In the example shown in FIG. 6A, the probability that a playable area of the slot game display will be enlarged if no trigger symbols land in the base game is p(0). In some instances, p(0) may equal zero. However as shown in FIG. 6B, p(0) can be non-zero: in this example p(0) is 20%

In the example shown in FIG. 6A, the probability that a triggering symbol will change to a wild symbol if one trigger symbol lands in the defined area is p(1), the probability that a triggering symbol will change to a wild symbol if two trigger symbols land in the defined area is p(2), etc. Specific examples of p(1) through p(12) are shown in FIG. 6B. In this example, one can see that the probability that a triggering symbol will change to a wild symbol if four trigger symbols land in the defined area (e.g., as shown in FIG. 5B) is 20%. In this example, the determination of whether a trigger symbol becomes a "Zorro Wild X2" is made separately for each Don symbol as it becomes a Zorro symbol. For example, if it is determined that a Don symbol will become a Zorro symbol there may be a 15% chance of the Don symbol becoming a Zorro Wild X2 symbol and an 85% chance of the Don symbol becoming a Zorro Wild symbol. In another example, if it is determined that a Don symbol will become a Zorro symbol there may be a 20% chance of the Don symbol becoming a Zorro Wild X2 symbol and an 80% chance of the Don symbol becoming a Zorro Wild symbol. In another example, if it is determined that a Don symbol will become a Zorro symbol there may be a 25% chance of the Don symbol becoming a Zorro Wild X2 symbol and a 75% chance of the Don symbol becoming a Zorro Wild symbol. In another example, if it is determined that a Don symbol will become a Zorro symbol there may be a 10% chance of the Don symbol becoming a Zorro Wild X2 symbol and a 90% chance of the Don symbol becoming a Zorro Wild symbol. These values are merely provided for the purpose of describing specific examples and are in no way limiting: other implementations may include different probability values.

In this example, the base game outcome corresponding to FIG. 5C is evaluated and paid. According to this implementation, the "Zorro Wild" and "Zorro Wild X2" symbols are held and persist to the next purchased base game. The enlarged playable area also persists to the next purchased base game.

Figure 7A:
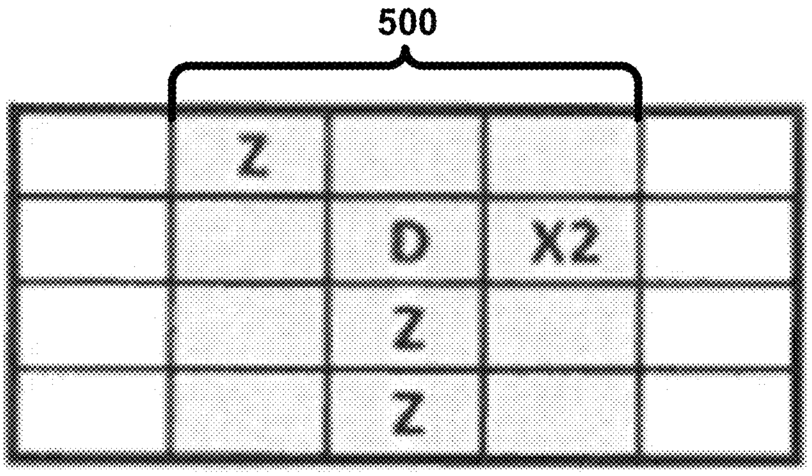
FIGS. 7A and 7B show examples of displays that may be presented during a subsequent purchased base game according to one example.
Figure 7B:
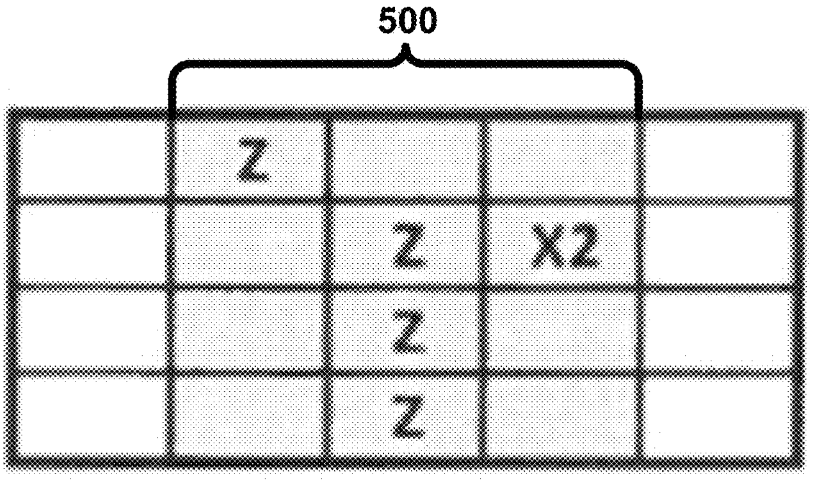

FIGS. 7A and 7B show examples of displays that may be presented during a subsequent purchased base game according to one example. During this base game, an additional "Don" symbol lands on one of the three center reels. (FIG. 7A.) According to this example, the "Don" symbol changes to a "Zorro Wild" symbol. (FIG. 7B.) In this example, the base game outcome corresponding to FIG. 7B is evaluated and paid. All of the "Zorro Wild" and "Zorro Wild X2" symbols again hold and persist for the next purchased game. The enlarged playable area also persists to the next purchased base game.

Figure 7C:
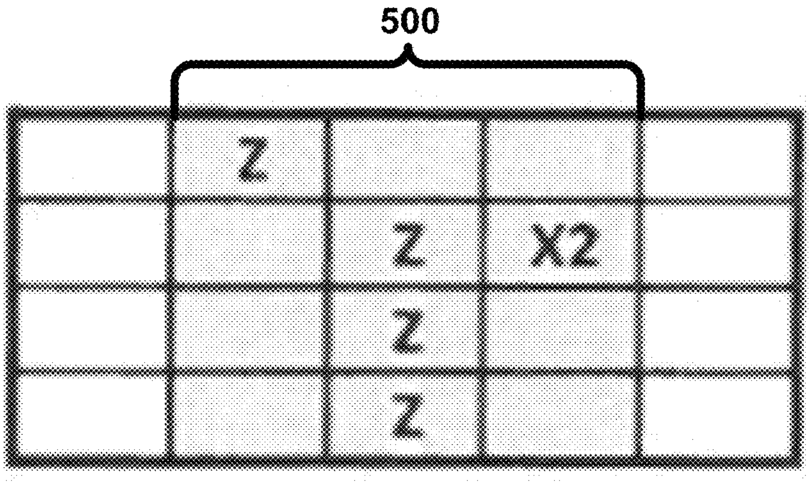
FIG. 7C shows an example of a display that may be presented during a purchased base game after the game represented in FIGS. 7A and 7B.

FIG. 7C shows an example of a display that may be presented during a purchased base game after the game represented in FIGS. 7A and 7B. During this game no additional "Don" symbols land. In this example, the base game outcome corresponding to FIG. 7C is evaluated and paid. Although FIG. 7B and FIG. 7C appear to be the same, that is merely because the display symbols other than wild symbols are not shown in either case. For the next purchased game, the playable area returns to 3 rows of display symbol positions and the previously held symbols spin off the playable area, e.g. as shown in FIG. 5A.

In some instances, the first wild symbol may indicate a first wild symbol credit value. According to some implementations, the method may involve determining, via the control system, a first credit award corresponding to the first base game outcome. Determining the first credit award may, in some instances, involve awarding the first wild symbol credit value regardless of whether the first wild symbol is part of a combination of winning symbols of the first base game outcome. Some such examples may involve determining, via the control system, the first wild symbol credit value from among a plurality of wild symbol credit values. In some such implementations, determining whether the first trigger symbol will be replaced with a first wild symbol having a credit value may involve a first RNG call and determining the first wild symbol credit value may involve a second RNG call.

Figure 8A:
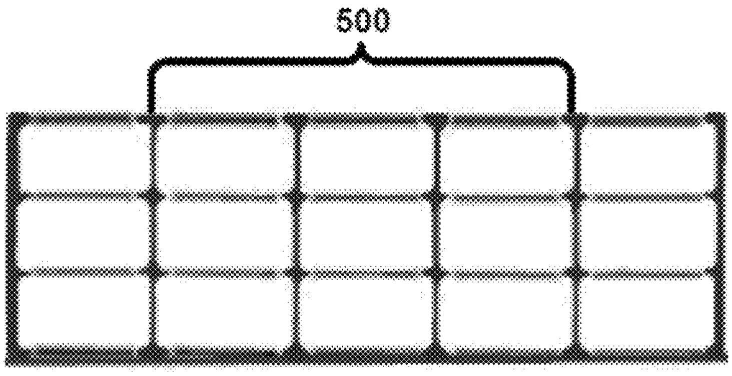
FIGS. 8A, 8B and 8C show examples of displays that may be presented during a purchased base game according to another example of the method of FIG. 4.
Figure 8B:
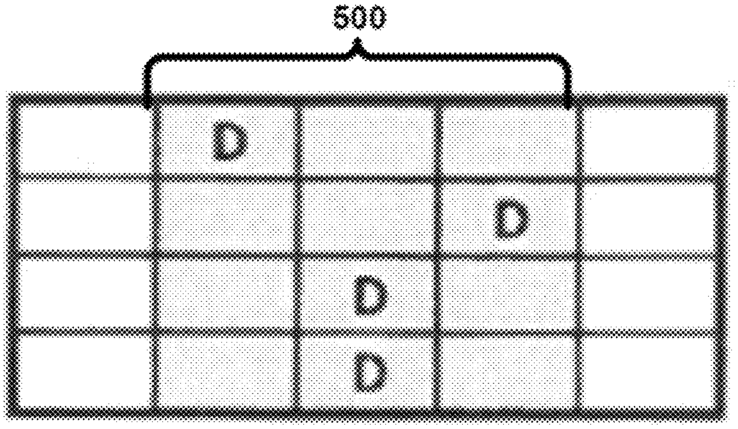
Figure 8C:
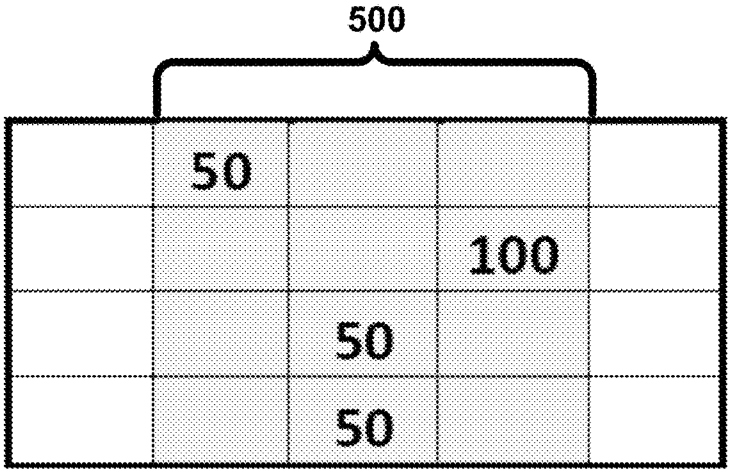

FIGS. 8A-8C show examples of displays that may be presented during a purchased base game according to another example of the method of FIG. 4. In some alternative examples, the game may be a feature or bonus game, e.g., a free game. As shown in FIG. 8A, in this example the base game is a five-reel slot game. Accordingly, in this example the display symbol positions are initially arranged in 3 display symbol rows and 5 display symbol columns. In some alternative examples, the display symbol positions may be initially arranged in different numbers of display symbol rows and display symbol columns, e.g., 4 display symbol rows and 5 display symbol columns, 4 display symbol rows and 6 display symbol columns, etc. FIG. 8A shows an example of the display symbol positions before a particular base game instance has started.

FIG. 8B shows an example of trigger symbols that have landed in a defined area of the display symbol positions during a presentation of a first base game outcome. In this instance, the defined area 500 includes the three center display reels, which are reels 2, 3 and 4 in this instance. According to this example, the trigger symbols are "Don" symbols, each of which is represented by a "D" in FIG. 8B.

In this example, the control system has determined that a playable area of the slot game display will be enlarged: the control system has caused another row of display symbol positions to be presented on the display. The defined area 500 now includes three additional display symbol positions. This increases the player's chances of having more "Dons" land during subsequent base game instances, thereby remaining in a bonus mode in which the playable area of the slot game display is enlarged.

When a Don symbol lands in the defined area 500, the Don symbol may randomly change to a wild symbol having a credit value. In the example shown in FIG. 9C, two different credit values are awarded, which are 50 credits and 100 credits in this instance. According to some examples, more or fewer than two different credit values may potentially be awarded, e.g., three different credit values, four different credit values, five different credit values, etc. Alternatively, or additionally, in some implementations, other credit values may potentially be awarded, e.g., 150 credits, 200 credits, 250 credits, 300 credits, 350 credits, 400 credits, 450 credits, 500 credits, 550 credits, 600 credits, 650 credits, 700 credits, 750 credits, 800 credits, 850 credits, 900 credits, 950 credits, 1000 credits, etc. According to this implementation, a higher number of triggering symbols corresponds with a greater probability that the triggering symbol will change to a wild symbol having a credit value.

FIGS. 9A and 9B show examples of probability distributions for having a triggering symbol change to a wild symbol having a credit value. In these examples, the probability distributions also correspond to the probability that a playable area of the slot game display will be enlarged. In the example shown in FIG. 9A, the probability that a playable area of the slot game display will be enlarged if no trigger symbols land in the base game is p(0). In some instances, p(0) may equal zero. However as shown in FIG. 9B, p(0) can be non-zero: in this example p(0) is 20%

In the example shown in FIG. 9A, the probability that a triggering symbol will change to a wild symbol having a credit value if one trigger symbol lands in the defined area is p(1), the probability that a triggering symbol will change to a wild symbol having a credit value if two trigger symbols land in the defined area is p(2), etc. Specific examples of p(1) through p(12) are shown in FIG. 9B. In this example, one can see that the probability that a triggering symbol will change to a wild symbol having a credit value if four trigger symbols land in the defined area (e.g., as shown in FIG. 8B) is 20%. In some examples, the determination of what the specific credit value will be is made separately for each triggering symbol as it becomes a wild symbol having a credit value. For example, if it is determined that a triggering symbol will become a wild symbol having a credit value there may be a 50% chance of the credit value being 50, a 25% chance of the credit value being 100, a 15% chance of the credit value being 250, an 8% chance of the credit value being 500 and a 2% chance of the credit value being 1000. These values are merely provided for the purpose of describing specific examples and are in no way limiting: other implementations may include different probability values and/or different credit values.

In this example, the base game outcome corresponding to FIG. 8C is evaluated and paid. According to this implementation, the wild symbols having credit values are held and persist to the next purchased base game. The enlarged playable area also persists to the next purchased base game.

Figure 10A:
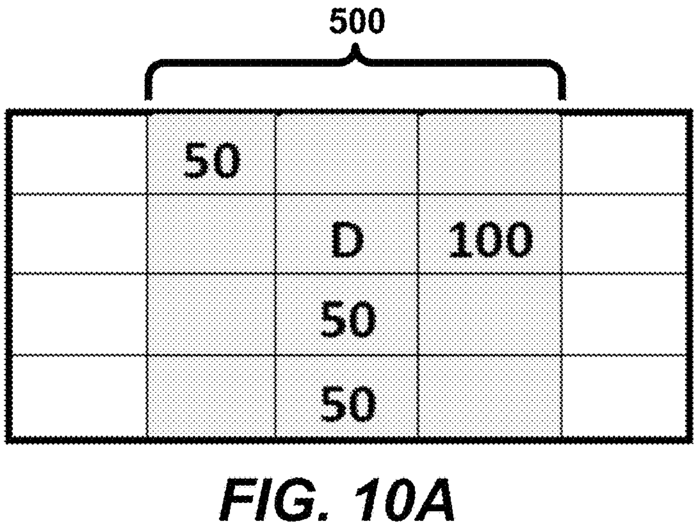
FIGS. 10A and 10B show examples of displays that may be presented during a subsequent purchased base game according to another example.
Figure 10B:
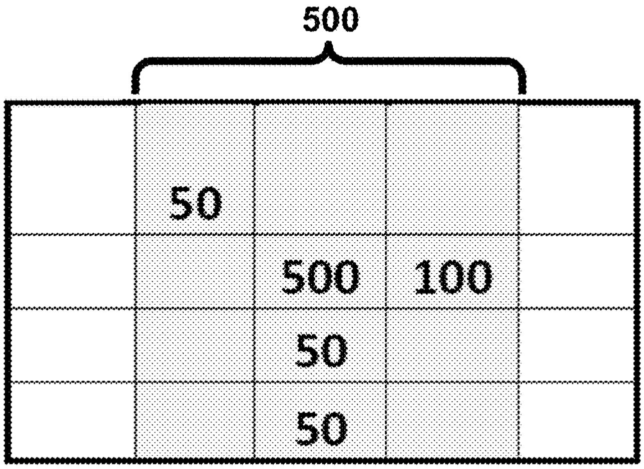

FIGS. 10A and 10B show examples of displays that may be presented during a subsequent purchased base game according to another example. During this base game, an additional "Don" symbol lands on one of the three center reels. (FIG. 10A.) According to this example, the "Don" symbol changes to a wild symbol having a credit value, which is 500 credits in this example. (FIG. 10B.) In this example, the base game outcome corresponding to FIG. 10B is evaluated and paid, including a bonus of 750 credits corresponding to the combined values of all wild symbols having a credit value. According to some implementations, the base game outcome will include a bonus corresponding to the combined values of all wild symbols having a credit value, even if none of the wild symbols having a credit value were part of a winning combination of symbols.

According to this example, all of the wild symbols having a credit value are again held and persist for the next purchased game. The enlarged playable area also persists to the next purchased base game.

Figure 10C:
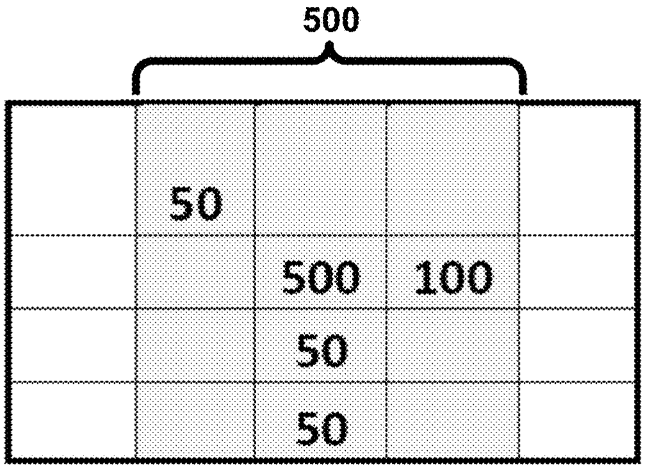
FIG. 10C shows an example of a display that may be presented during a purchased base game after the game represented in FIGS. 10A and 10B.

FIG. 10C shows an example of a display that may be presented during a purchased base game after the game represented in FIGS. 10A and 10B. During this game no additional "Don" symbols land. In this example, the base game outcome corresponding to FIG. 10C is evaluated and paid. Although FIG. 10B and FIG. 10C appear to be the same, that is merely because the display symbols other than wild symbols are not shown in either case. For the next purchased game, the playable area returns to 3 rows of display symbol positions and the previously held symbols spin off the playable area, e.g. as shown in FIG. 8A.

Some implementations may involve determining, via the control system, the first wild symbol type from among a plurality of wild symbol types. For example, the plurality of wild symbol credit types may include a multiplier wild symbol having a multiplier value. The multiplier wild symbol may be a wild symbol that causes an award to be multiplied by the multiplier value. The award may correspond to a combination of winning symbols that includes the multiplier wild symbol. In some examples, the wild symbol types may include a "prize on" wild symbol, a plain wild symbol (e.g., without a prize on or a multiplier) and/or an expanding wild symbol. In some examples of an expanding wild symbol, the same type of wild symbol may be displayed in an entire display symbol column or reel. Determining whether the first trigger symbol will be replaced with the first wild symbol may, for example, involve a first RNG call and determining the first wild symbol type may involve a second RNG call. Determining whether the first trigger symbol will be replaced with the first wild symbol and/or determining the first wild symbol type may be based, at least in part, on a display symbol row or a display symbol column of the first display symbol position. According to some implementations, the first wild symbol may be a first wild symbol type and the first trigger symbol may be a second wild symbol type.

Figure 11A:
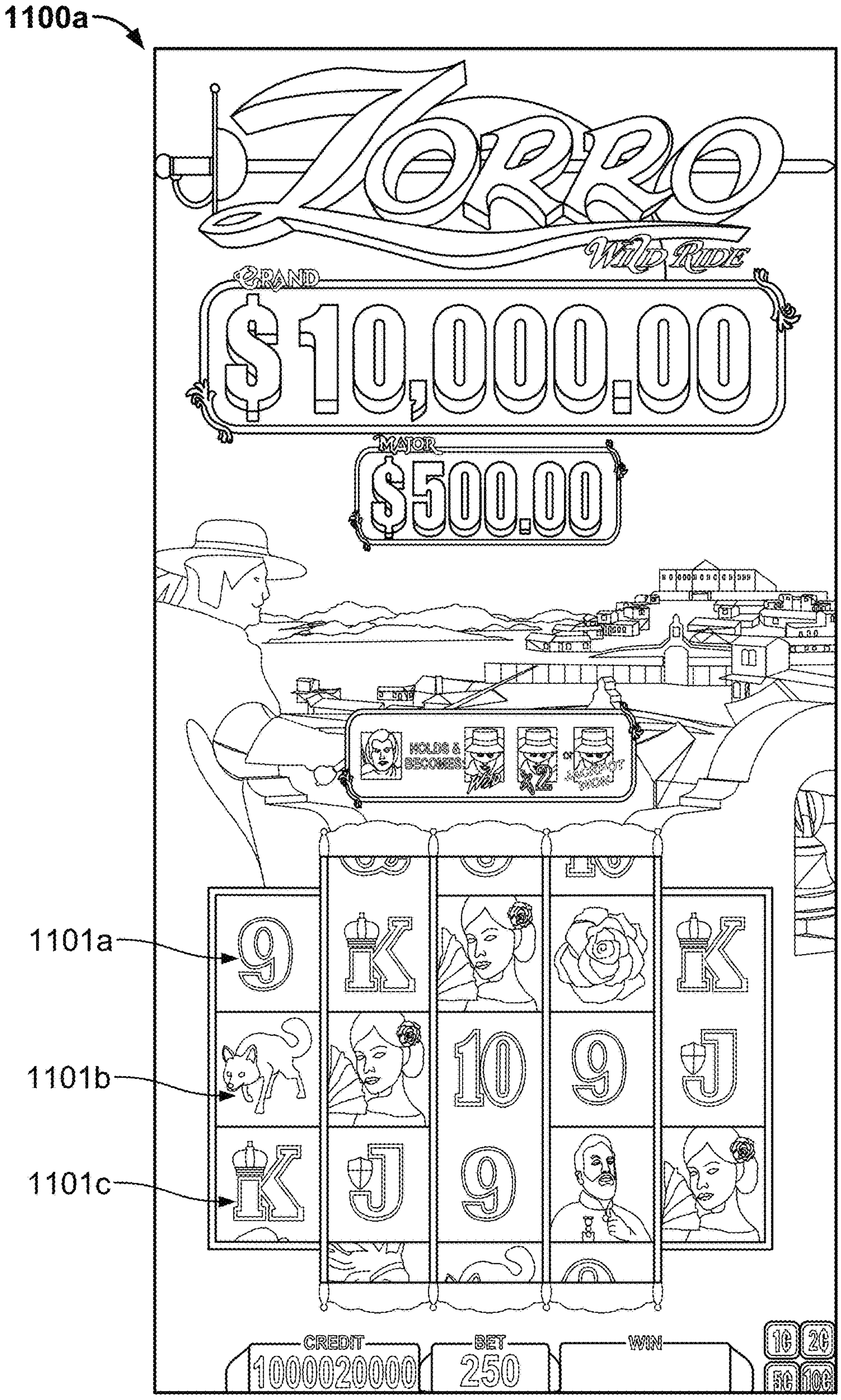
FIG. 11A shows another example of a display that may be presented during a purchased base game according to some examples of the method of FIG. 4.

FIG. 11A shows another example of a display that may be presented during a purchased base game according to some examples of the method of FIG. 4. In some alternative examples, the game may be a feature or bonus game, e.g., a free game. In this example, the base game has a Zorro theme. As shown in FIG. 11A, the base game is a five-reel slot game. Accordingly, in this example the display symbol positions are initially arranged in 3 display symbol rows (1101*a*, 1101*b* and 1101*c*) and 5 display symbol columns. In some alternative examples, the display symbol positions may be initially arranged in different numbers of display symbol rows and display symbol columns, e.g., 4 display symbol rows and 5 display symbol columns, 4 display symbol rows and 6 display symbol columns, etc. The display instance 1100*a* of FIG. 11A shows an example of display symbol positions corresponding to a particular base game instance.

Figure 11B:
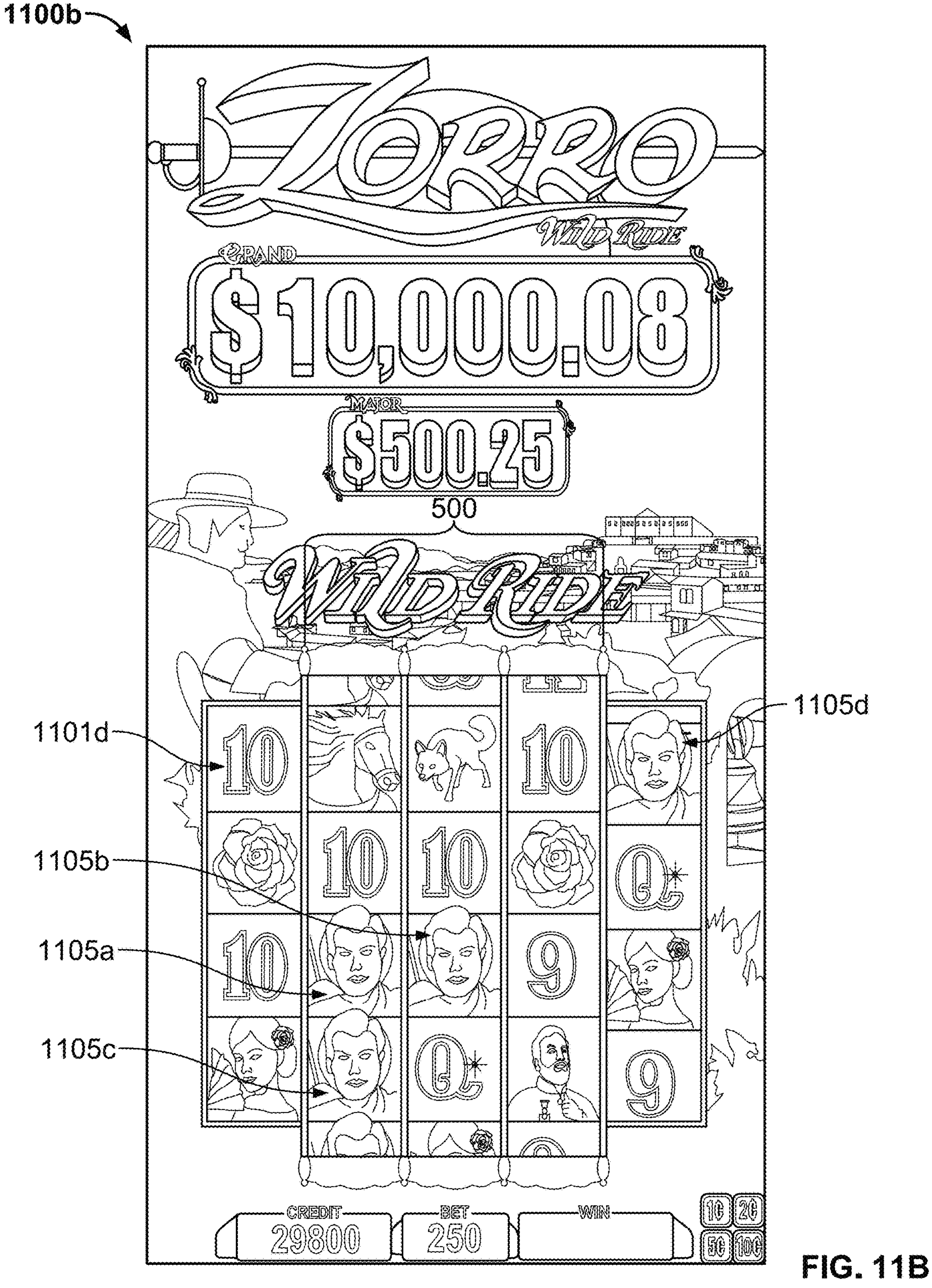
FIG. 11B shows an example of a display that may be presented during a subsequent purchased base game according to some examples.

FIG. 11B shows an example of a display that may be presented during a subsequent purchased base game according to some examples. The display instance 1100*b* of FIG. 11B shows an example of display symbol positions corresponding to an outcome of the next base game instance after that depicted in FIG. 11A. FIG. 11B shows an example of trigger symbols 1105*a*, 1105*b* and 1105*c* that have landed in a defined area 500 of the display symbol positions during a presentation of a first base game outcome. In this instance, the defined area 500 includes the three center display symbol columns or "reels," reels 2, 3 and 4. According to this example, the trigger symbols are "Don" symbols.

In this example, the control system has determined that a playable area of the slot game display will be enlarged: the control system has caused another row (1101*d*) of display symbol positions to be presented on the display. Therefore, the defined area 500 now includes three additional display symbol positions, as compared to the defined area 500 shown in FIG. 11A. This increases the player's chances of having more "Dons" land during this base game instance or subsequent base game instances.

Figure 11C:
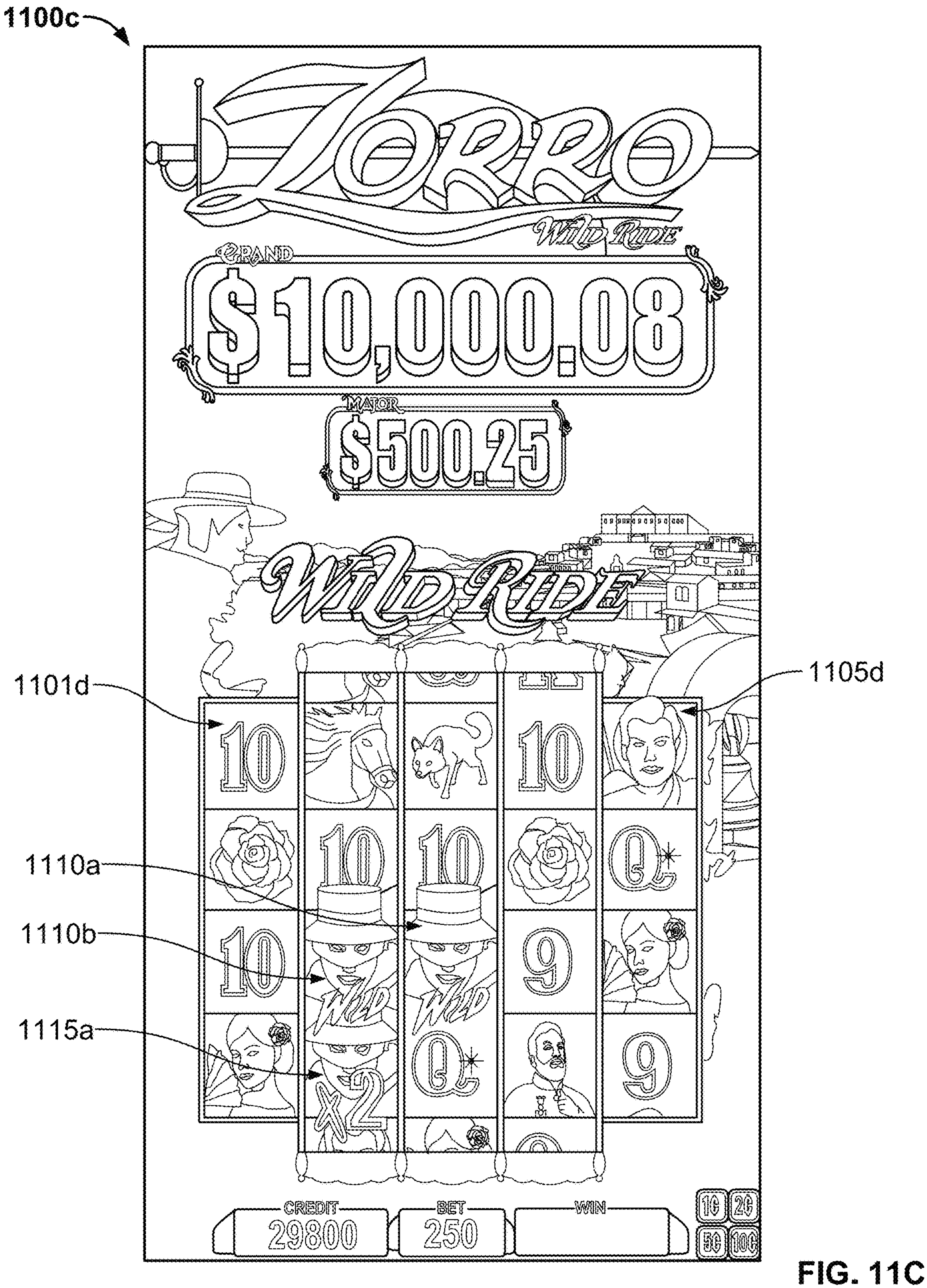
FIG. 11C shows an example of a display that may be presented after that of FIG. 11B according to some examples.

FIG. 11C shows an example of a display that may be presented after that of FIG. 11B according to some examples. The display instance 1100*c* of FIG. 11C shows an example of display symbol positions corresponding to a subsequent stage of a game outcome presentation of the same base game instance depicted in FIG. 11B. In the example shown in FIG. 11C, the trigger symbols 1105*a* and 1105*b* have changed to "Zorro Wild" symbols 1110*a* and 1110*b*, and the trigger symbol 1105*c* has changed to a "Zorro Wild X2" symbol 1115*a*. In this instance, the trigger symbol 1105*d* has landed in row 1101*d*. However, because the trigger symbol 1105*d* has landed outside of the defined area 500, in display symbol column 5, the trigger symbol 1105*d* could not potentially be replaced with a wild symbol according to this example.

According to this implementation, a higher number of triggering symbols that land inside of the defined area 500 corresponds with a greater probability that the triggering symbol(s) will change to a wild symbol. The probabilities that triggering symbol will change to a wild symbol and/or that a wild symbol will be a Zorro Wild symbol or a Zorro Wild X2 symbol may, for example, be as described above with reference to FIG. 6A et seq.

In this example, the base game outcome corresponding to FIG. 11C is evaluated and paid. According to this implementation, the "Zorro Wild" and "Zorro Wild X2" symbols are held and persist to the next purchased base game. The enlarged playable area also persists to the next purchased base game.

Figure 11D:
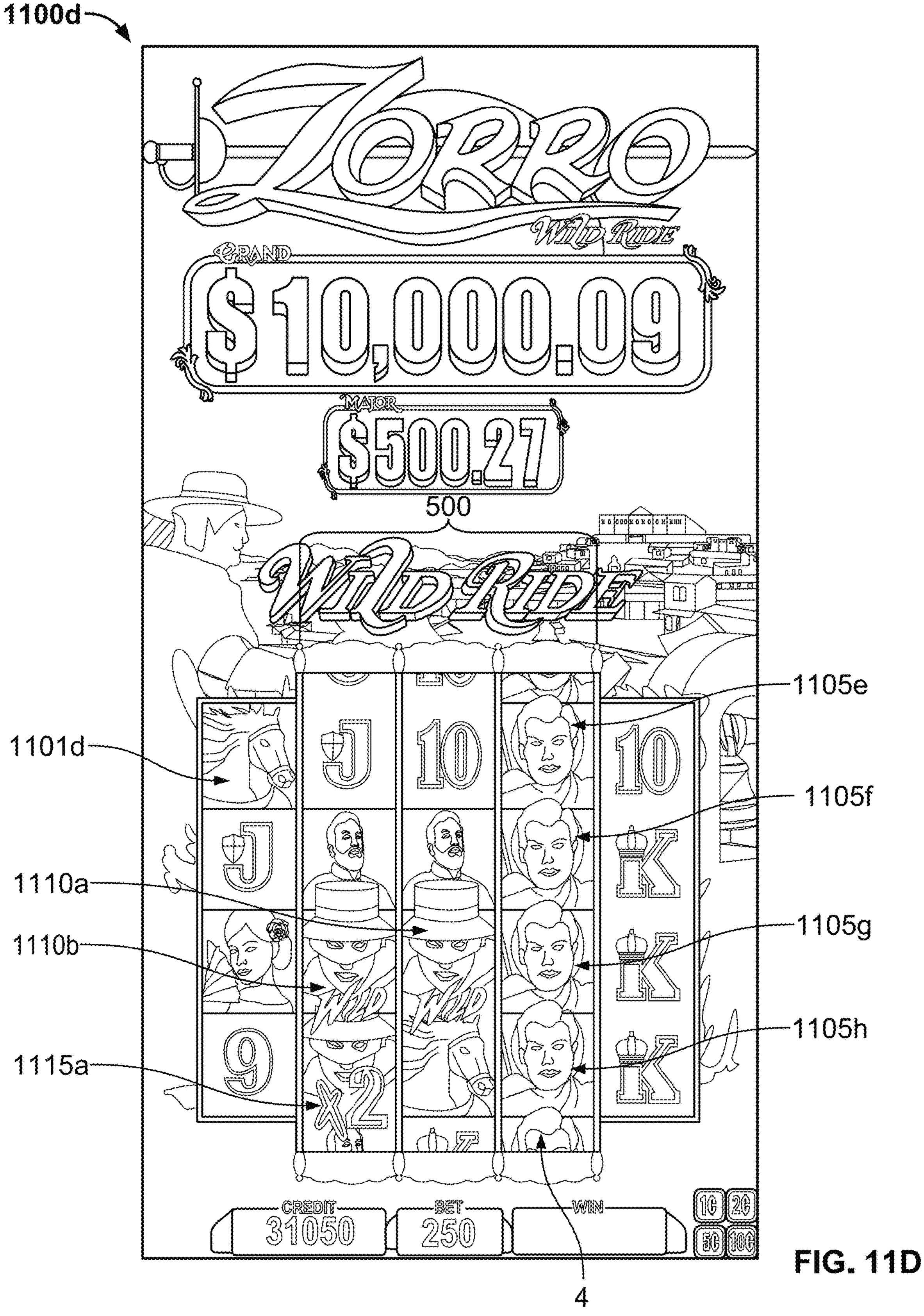
FIG. 11D shows an example of a display that may be presented during a subsequent purchased base game according to some examples.

FIG. 11D shows an example of a display that may be presented during a subsequent purchased base game according to some examples. The display instance 1100*d* of FIG. 11D shows an example of display symbol positions corresponding to an outcome of the next base game instance after that depicted in FIGS. 11B and 11C. In this example, the game outcome includes an entire display symbol column (column 4, a/k/a reel 4) of trigger symbols, trigger symbols 1105*g*-1105*h*.

Figure 11E:
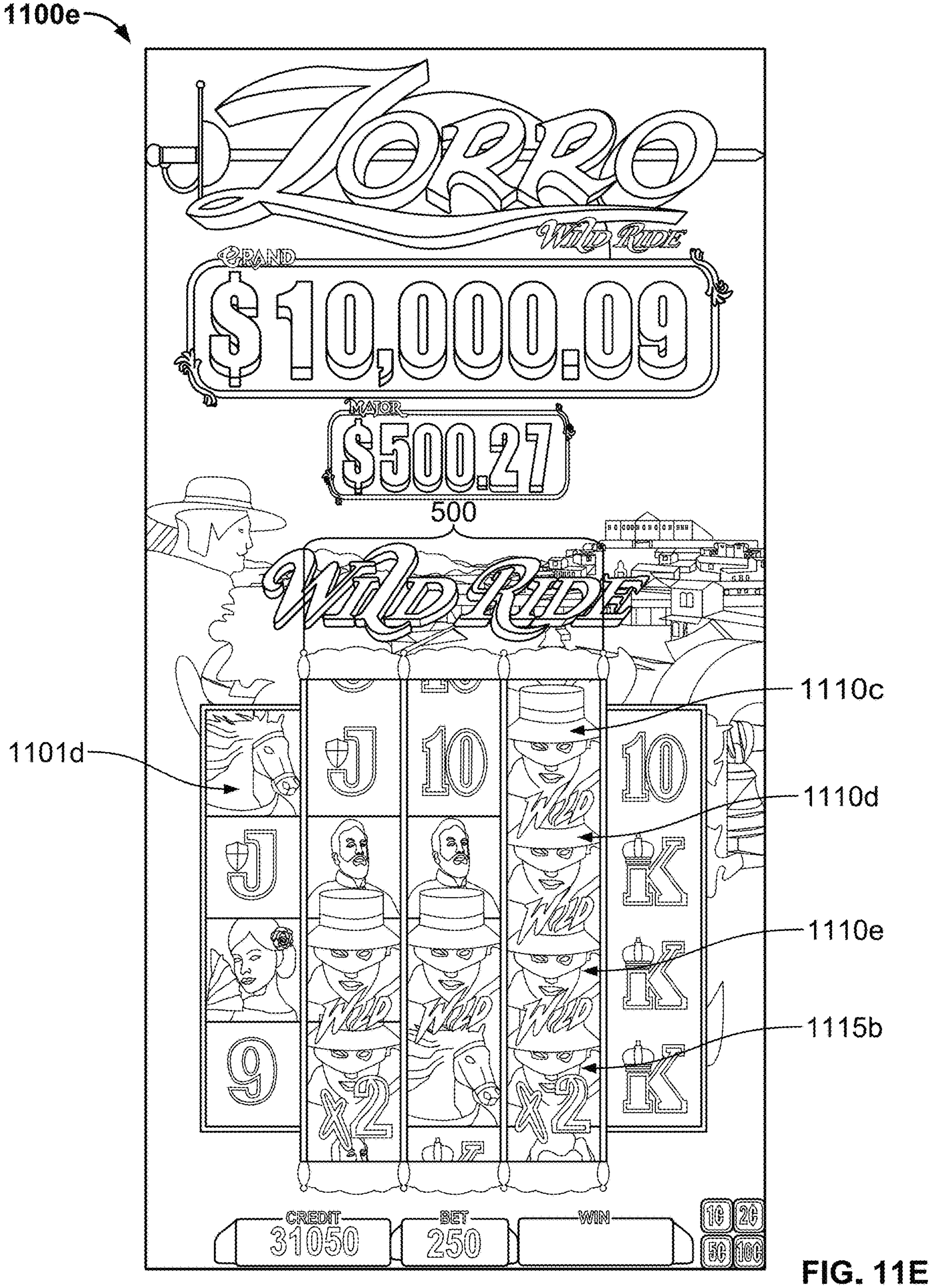
FIG. 11E shows an example of a display that may be presented after that of FIG. 11D according to some examples.

FIG. 11E shows an example of a display that may be presented after that of FIG. 11D according to some examples. The display instance 1100*e* of FIG. 11E shows an example of display symbol positions corresponding to a subsequent stage of a game outcome presentation of the same base game instance depicted in FIG. 11D. In the example shown in FIG. 11E, the trigger symbols 1105*e*, 1105*f* and 1105*g* have changed to "Zorro Wild" symbols 1110*c*, 1110*d* and 1110*e*, respectively. In this instance, the trigger symbol 1105*h* has changed to the "Zorro Wild X2" symbol 1115*b*. Because at least one trigger symbol landed in the defined area 500, the active display symbol positions continue to include the row 1101*d*.

Figure 11F:
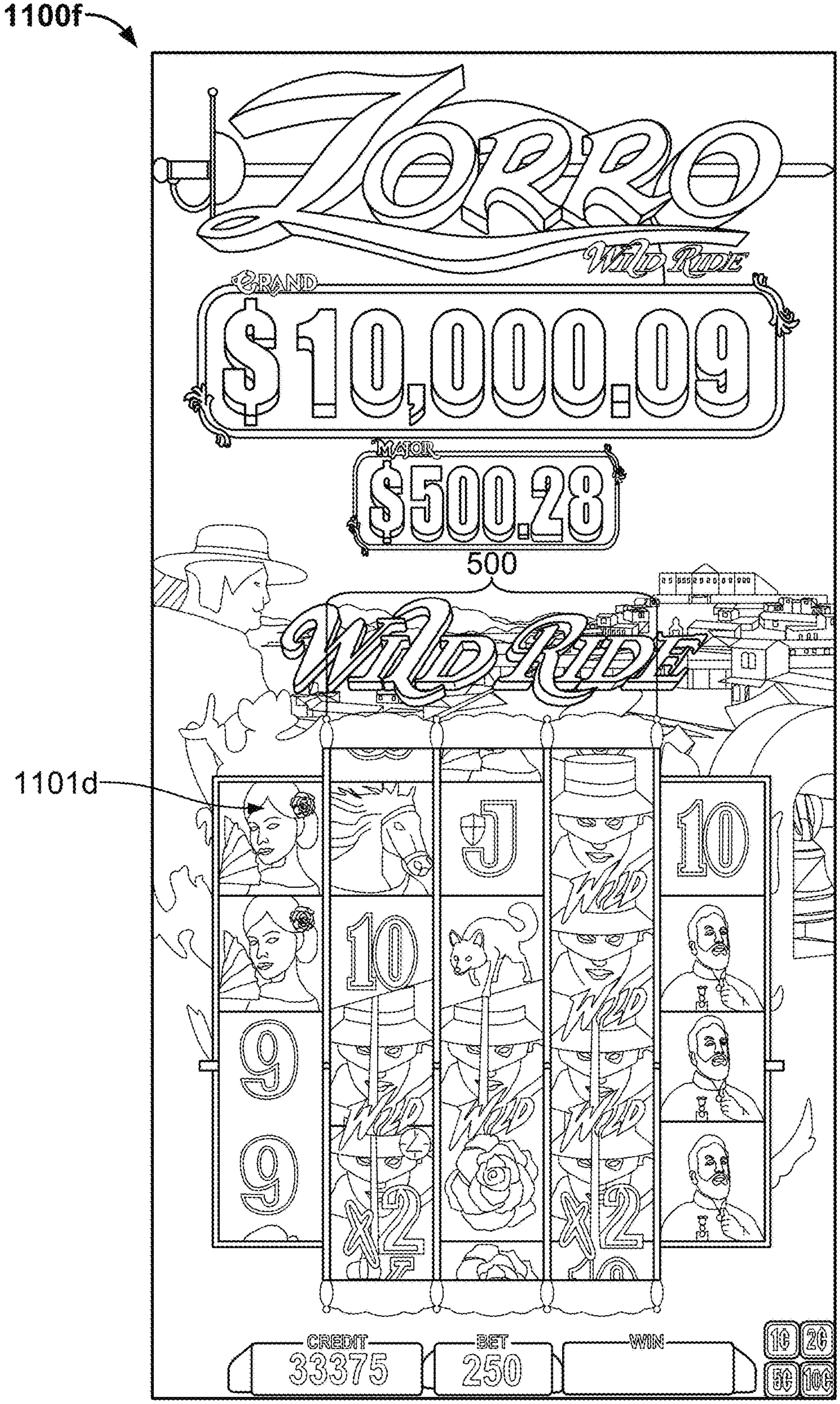
FIG. 11F shows an example of a display that may be presented during a subsequent purchased base game according to some examples.

FIG. 11F shows an example of a display that may be presented during a subsequent purchased base game according to some examples. The display instance 1100*f* of FIG. 11F shows an example of display symbol positions corresponding to an outcome of the next base game instance after that depicted in FIGS. 11D and 11E. In this example, the game outcome includes no trigger symbol in the defined area 500. Therefore, according to this implementation, the active display symbol positions for the next game instance will not continue to include the row 1101*d*.

While the invention has been described with respect to the figures, it will be appreciated that many modifications and changes may be made by those skilled in the art without departing from the spirit of the invention. For example, although various examples are described as embodiments of base games, the concepts disclosed herein can also be applied to other types of games, such as feature games or bonus games, e.g., free spins of a slot game. Any variation and derivation from the above description and figures are included in the scope of the present invention as defined by the claims.

The invention claimed is:

1. A gaming method, comprising:

receiving, by one or more servers and via a network interface system, an indication to initiate a first instance of a base game on an end user device (EUD), the base game comprising a slot game;

determining, via the one or more servers, a first base game outcome and corresponding first display symbols, wherein the first display symbols comprise one or more trigger symbols, wherein determining the first base game outcome comprises determining whether the one or more trigger symbols will be replaced with one or more wild symbols, wherein determining whether the one or more trigger symbols will be replaced with one or more wild symbols involves a first random component that is linked to a set of probability distributions, and wherein a higher number of trigger symbols corresponds with a greater probability that the one or more trigger symbols will change to the one or more wild symbols;

sending, by the one or more servers and via the network interface system, instructions for controlling an EUD display system of the EUD to display the corresponding first display symbols at a plurality of display symbol positions on the EUD display system, wherein the plurality of display symbol positions are arranged in a plurality of display symbol rows and display symbol columns; and upon determining, by the one or more servers, that the one or more trigger symbols will be replaced with the one or more wild symbols, sending, by the one or more servers and via the network interface system, instructions for controlling the EUD display system to replace the one or more trigger symbols with the one or more wild symbols.

2. The gaming method of claim 1, wherein the higher number of trigger symbols that corresponds with the greater probability includes the one or more trigger symbols in the first display symbols of the first base game outcome.

3. The gaming method of claim 2, wherein the higher number of trigger symbols that corresponds with the greater probability further includes one or more trigger symbols displayed at the plurality of display symbol positions before the first instance of the base game.

4. The gaming method of claim 1, wherein determining whether the one or more trigger symbols will be replaced with the one or more wild symbols involves a first random number generator (RNG) call and wherein determining a wild symbol type involves a second RNG call.

5. The gaming method of claim 1, wherein:

the set of probability distributions correspond to a number of trigger symbols that land in a defined area of the display symbol positions in the first base game outcome, and the defined area is subset of a total number of display symbol positions.

6. The gaming method of claim 5, wherein the defined area corresponds to a particular row and/or a particular column.

7. The gaming method of claim 1, further comprising enlarging a playable area of a game display upon an occurrence of an enlargement triggering event, wherein the probability that the playable area of the game display will be enlarged corresponds to the probability distributions.

8. The gaming method of claim 1, wherein the higher number of trigger symbols corresponds with a greater probability that the one or more trigger symbols will change to one or more wild symbols having a credit value.

9. A server, comprising:

a network interface system configured for communication with an end user device EUD; and a control system comprising one or more processors, the control system configured for:

receiving, via the network interface system, an indication to initiate a first instance of a base game on the EUD, the base game comprising a slot game;

determining a first base game outcome and corresponding first display symbols, wherein the first display symbols comprise one or more trigger symbols, wherein determining the first base game outcome comprises determining whether the one or more trigger symbols will be replaced with one or more wild symbols, wherein determining whether the one or more trigger symbols will be replaced with one or more wild symbols involves a first random component that is linked to a set of probability distributions, and wherein a higher number of trigger symbols corresponds with a greater probability that the one or more trigger symbols will change to the one or more wild symbols;

sending, via the network interface system, instructions for controlling an EUD display system of the EUD to display the corresponding first display symbols at a plurality of display symbol positions on the EUD display system, wherein the plurality of display symbol positions are arranged in a plurality of display symbol rows and display symbol columns; and upon determining that the one or more trigger symbols will be replaced with the one or more wild symbols, sending, via the network interface system, instructions for controlling the EUD display system to replace the one or more trigger symbols with the one or more wild symbols.

10. The server of claim 9, wherein the higher number of trigger symbols that corresponds with the greater probability includes the one or more trigger symbols in the first display symbols of the first base game outcome.

11. The server of claim 10, wherein the higher number of trigger symbols that corresponds with the greater probability further includes one or more trigger symbols displayed at the plurality of display symbol positions before the first instance of the base game.

12. The server of claim 9, wherein determining whether the one or more trigger symbols will be replaced with the one or more wild symbols involves a first random number generator (RNG) call and wherein determining a wild symbol type involves a second RNG call.

13. The server of claim 9, wherein:

the set of probability distributions correspond to a number of trigger symbols that land in a defined area of the display symbol positions in the first base game outcome, and the defined area is subset of a total number of display symbol positions.

14. The server of claim 9, wherein:

presenting the one or more instances of the base game further comprises enlarging a playable area of the game display upon an occurrence of an enlargement triggering event, and the probability that the playable area of the game display will be enlarged corresponds to the probability distributions.

15. One or more non-transitory media having software stored thereon, the software including instructions for performing a method, the method comprising:

receiving, by one or more servers and via a network interface system, an indication to initiate a first instance of a base game on an end user device (EUD), the base game comprising a slot game;

determining, via the one or more servers, a first base game outcome and corresponding first display symbols, wherein the first display symbols comprise one or more trigger symbols, wherein determining the first base game outcome comprises determining whether the one or more trigger symbols will be replaced with one or more wild symbols, wherein determining whether the one or more trigger symbols will be replaced with one or more wild symbols involves a first random component that is linked to a set of probability distributions, and wherein a higher number of trigger symbols corresponds with a greater probability that the one or more trigger symbols will change to the one or more wild symbols;

sending, by the one or more servers and via the network interface system, instructions for controlling an EUD display system of the EUD to display the corresponding first display symbols at a plurality of display symbol positions on the EUD display system, wherein the plurality of display symbol positions are arranged in a plurality of display symbol rows and display symbol columns; and upon determining, by the one or more servers, that the one or more trigger symbols will be replaced with the one or more wild symbols, sending, by the one or more servers and via the network interface system, instructions for controlling the EUD display system to replace the one or more trigger symbols with the one or more wild symbols.

16. The one or more non-transitory media of claim 15, wherein the higher number of trigger symbols that corresponds with the greater probability includes the one or more trigger symbols in the first display symbols of the first base game outcome.

17. The one or more non-transitory media of claim 16, wherein the higher number of trigger symbols that corresponds with the greater probability further includes one or more trigger symbols displayed at the plurality of display symbol positions before the first instance of the base game.

18. The one or more non-transitory media of claim 15, wherein determining whether the one or more trigger symbols will be replaced with the one or more wild symbols involves a first random number generator (RNG) call and wherein determining a wild symbol type involves a second RNG call.

19. The one or more non-transitory media of claim 15, wherein:

the set of probability distributions correspond to a number of trigger symbols that land in a defined area of the display symbol positions in the first base game outcome, and the defined area is subset of a total number of display symbol positions.

20. The one or more non-transitory media of claim 15, wherein:

the method further comprises enlarging a playable area of the game display upon an occurrence of an enlargement triggering event, and the probability that the playable area of the game display will be enlarged corresponds to the probability distributions.

* * * * *